United States Patent
Dempster et al.

(10) Patent No.: US 9,800,713 B2
(45) Date of Patent: Oct. 24, 2017

(54) MOISTURE DETECTION RESPONSE

(71) Applicant: HzO, Inc., Draper, UT (US)

(72) Inventors: James Douglas Dempster, Reno, NV (US); Jason Maynard, Salt Lake City, UT (US)

(73) Assignee: HZO, Inc., Draper, UT (US)

( * ) Notice: Subject to any disclaimer, the term of this patent is extended or adjusted under 35 U.S.C. 154(b) by 0 days.

(21) Appl. No.: 14/539,705

(22) Filed: Nov. 12, 2014

(65) Prior Publication Data

US 2016/0080553 A1    Mar. 17, 2016

Related U.S. Application Data

(60) Provisional application No. 62/049,811, filed on Sep. 12, 2014.

(51) Int. Cl.
*H04B 1/38*    (2015.01)
*H04M 1/725*    (2006.01)
(Continued)

(52) U.S. Cl.
CPC ........ *H04M 1/72569* (2013.01); *G01F 23/00* (2013.01); *G08B 21/20* (2013.01);
(Continued)

(58) Field of Classification Search
CPC ......... H04W 4/22; G01D 21/00; G08B 19/00; H04Q 2209/43; H04Q 2209/823;
(Continued)

(56) References Cited

U.S. PATENT DOCUMENTS 4,297,686 A    10/1981    Tom
4,466,285 A    8/1984    Allemano
(Continued)

FOREIGN PATENT DOCUMENTS

CN    2702453 Y    5/2005
CN    201657083 U    11/2010
(Continued)

OTHER PUBLICATIONS

Neil Hughes, "Apple looking to improve water sensors for detecting iPhone damage," dated Feb. 17, 2012, pp. 1-10, Apple Insider, http://appleinsider.com.
(Continued)

*Primary Examiner* — Charles Appiah
*Assistant Examiner* — Edward Zhang
(74) *Attorney, Agent, or Firm* — Kunzler Law Group

(57) ABSTRACT

Configuration of detection of physical conditions in and/or around a communication apparatus is described. Further, configuration of an action responsive to the detection of physical conditions, or changes in physical conditions, is described. The communication apparatus may output a user notification in response to a moisture detection notification. A user interface of the communication apparatus may receive a user response. Further actions may be then taken based on the user response to the user notification. Alternatively or in addition, an end-user may predetermine a set of actions to be performed in response to the moisture event. Further, a respective set of actions may be specified for several possible severity levels or thresholds values of the moisture detection.

19 Claims, 10 Drawing Sheets

(51) Int. Cl.
  *G01F 23/00*     (2006.01)
  *G08B 21/20*     (2006.01)
  *H04Q 9/00*      (2006.01)
  *H04M 1/18*      (2006.01)
  *H04W 88/02*     (2009.01)

(52) U.S. Cl.
  CPC ............ *H04M 1/18* (2013.01); *H04Q 9/00* (2013.01); *H04M 2250/12* (2013.01); *H04Q 2209/823* (2013.01); *H04W 88/02* (2013.01)

(58) Field of Classification Search
  CPC ........ H04Q 9/00; F24F 11/001; F24F 11/006; F24F 2011/0075; F24F 11/0012; F24F 11/0076; F24F 2011/0006; F24F 2011/0052
  See application file for complete search history.

(56) References Cited

U.S. PATENT DOCUMENTS

| | | | |
|---|---|---|---|
| 4,835,716 A | 5/1989 | Tamaki et al. | |
| 4,918,433 A | 4/1990 | Moore | |
| 5,097,254 A | 3/1992 | Merrithew | |
| 5,847,473 A | 12/1998 | Anfosso et al. | |
| 5,889,466 A | 3/1999 | Ferguson | |
| 6,526,807 B1 | 3/2003 | Doumit et al. | |
| 6,603,319 B1 | 8/2003 | Kasahara et al. | |
| 6,614,722 B2 | 9/2003 | Polany et al. | |
| 6,683,535 B1 | 1/2004 | Utke | |
| 6,843,694 B2 | 1/2005 | Simmons | |
| 7,142,123 B1* | 11/2006 | Kates ................... G01N 27/048 340/602 |
| 7,554,453 B2 | 6/2009 | Snyder et al. | |
| 7,642,921 B2 | 1/2010 | Cutler et al. | |
| 7,671,754 B2 | 3/2010 | Heilmann et al. | |
| 7,889,087 B2 | 2/2011 | Boss et al. | |
| 8,063,765 B2 | 11/2011 | Johnson et al. | |
| 8,118,681 B2 | 2/2012 | Mattice et al. | |
| 8,255,006 B1 | 8/2012 | Chavez et al. | |
| 8,330,475 B2 | 12/2012 | Van Bezooijen et al. | |
| 8,359,172 B2 | 1/2013 | Fattah | |
| 8,374,553 B1* | 2/2013 | Campbell ............ A01G 25/167 137/78.3 |
| 8,440,274 B2 | 5/2013 | Wang | |
| 8,482,305 B2 | 7/2013 | Johnson | |
| 8,625,393 B2 | 1/2014 | Sonnenschein et al. | |
| 8,643,712 B2 | 2/2014 | Tsai | |
| 8,731,342 B2 | 5/2014 | Yang et al. | |
| 8,773,271 B1 | 7/2014 | Stevens et al. | |
| 8,781,420 B2 | 7/2014 | Schlub | |
| 8,958,854 B1* | 2/2015 | Morley ................... H04B 1/38 370/311 |
| 2003/0024315 A1 | 2/2003 | Merkel et al. | |
| 2005/0079888 A1 | 4/2005 | Menz et al. | |
| 2006/0079888 A1 | 4/2006 | Mulier et al. | |
| 2008/0088462 A1 | 4/2008 | Breed | |
| 2009/0107220 A1* | 4/2009 | Chen .................... G01N 27/223 73/73 |
| 2009/0207031 A1 | 8/2009 | Barth et al. | |
| 2010/0176956 A1 | 7/2010 | Moerschell | |
| 2010/0248792 A1* | 9/2010 | Yamashita ............. G03B 21/10 455/566 |
| 2011/0067576 A1 | 3/2011 | White et al. | |
| 2011/0074596 A1* | 3/2011 | Frohlick ................ G01D 21/00 340/691.1 |
| 2011/0105100 A1* | 5/2011 | Tanaka ................. H01H 13/702 455/418 |
| 2011/0109333 A1 | 5/2011 | Porjo et al. | |
| 2011/0137472 A1* | 6/2011 | Hitt ...................... A01G 25/167 700/284 |
| 2011/0268292 A1 | 11/2011 | Suvanto et al. | |
| 2012/0178367 A1* | 7/2012 | Matsumoto ........ G06K 19/0707 455/41.1 |
| 2012/0218673 A1 | 8/2012 | Oguri | |
| 2012/0231841 A1 | 9/2012 | Neiderberger et al. | |
| 2012/0286949 A1 | 11/2012 | Worthington et al. | |
| 2012/0324384 A1* | 12/2012 | Cohen ................. G06F 3/04886 715/765 |
| 2013/0151870 A1 | 6/2013 | Chuang | |
| 2013/0182360 A1 | 7/2013 | Stevens et al. | |
| 2013/0210297 A1 | 8/2013 | Maas et al. | |
| 2013/0225237 A1 | 8/2013 | Minami | |
| 2013/0286576 A1 | 10/2013 | Toya | |
| 2013/0325265 A1 | 12/2013 | Percher | |
| 2014/0057688 A1 | 2/2014 | Shinoda et al. | |
| 2014/0120866 A1* | 5/2014 | Furtney ............. H04W 52/0296 455/406 |
| 2014/0186177 A1 | 7/2014 | Bohme et al. | |
| 2014/0191873 A1 | 7/2014 | Kreiner et al. | |
| 2014/0237304 A1* | 8/2014 | Lai ...................... G06F 11/0742 714/57 |
| 2014/0307356 A1 | 10/2014 | Hong et al. | |
| 2014/0327991 A1* | 11/2014 | Chung .................... H02H 5/083 361/18 |
| 2015/0016000 A1 | 1/2015 | Quirk et al. | |
| 2015/0179037 A1* | 6/2015 | Ren ......................... G01L 7/18 340/522 |

FOREIGN PATENT DOCUMENTS

| | | |
|---|---|---|
| DE | 3605633 A1 | 9/1987 |
| EP | 0 316 551 | 5/1989 |
| EP | 1158511 A2 | 11/2001 |
| JP | H05-281172 A | 10/1993 |
| WO | WO 2011/064737 A2 | 6/2011 |

OTHER PUBLICATIONS

Kevin Purcell, "How to Find Your Mobile Phone's Water Sensor," dated Aug. 16, 2010, pp. 1-3, www.Notebooks.com.

Matthew Braga, "Stay Dry: Where to Find Your Phone's Water Sensors," dated Aug. 16, 2010, pp. 1-8, www.Tested.com.

"Depth/Level Druck Submersible Pressure Sensors Product Guide," dated 2005, pp. 1-6, GE Sensing.

Jinlan, Gau et al., "Printed Humidity Sensor with Memory Functionality for Passive RFID Tags", dated May 1, 2015, pp. 1824-1834, vol. 13, No. 5, IEEE Sensors Journal, IEEE Service Center, New York, NY.

Pandey, Gunjan et al., "A low profile, low RF band, small antenna for underground, in-situ sensing and wireless energy-efficient transmission", dated Apr. 7, 2014, pp. 179-184, Proceedings of the 11th IEEE International Conference on Networking, Sensing and control, IEEE, New York, NY.

International Search Report and Written Opinion for PCT/US2015/049772, dated Dec. 17, 2015.

European Search Report for EP14196315, dated Sep. 9, 2015.

\* cited by examiner

MOISTURE DETECTION RESPONSE

This application claims priority to U.S. Provisional Application Ser. No. 62/049,811, entitled "Water Sensing and Notification," filed Sep. 12, 2014, which is incorporated herein by reference in its entirety.

BACKGROUND

1. Technical Field

This application relates to communication apparatuses and, in particular, to detection of moisture in and/or around the communication apparatuses.

2. Background

A communication apparatus may be damaged due to moisture, heat, fall, or any other such physical conditions. The communication apparatus may be equipped with sensors to detect physical conditions, such as moisture, heat, and/or fall.

The communication apparatus, which is manufactured by a manufacturer, may be provided to an end-user by a provider, such as a phone company, a communication provider, an employer, or any other entity. The communication apparatus may be preprogrammed with preset values by the manufacturer and/or the provider, where the preset values determine how the communication apparatus responds to the detected physical conditions. The preset values may not be ideal, or efficient, or desirable, or suitable, for usage by the end-user. The preset values may result in annoying notifications, and or inefficient power consumption.

SUMMARY

A communication apparatus may be equipped with a sensor to generate a moisture event based on detection of moisture. The communication apparatus may further include a sensor response control component to receive the moisture event and, in response, generate a user notification. A user interface of the communication apparatus may output the user notification and receive a user response. The sensor response control component may shut down the communication apparatus or a subsystem of the communication apparatus based on the user response.

A method may include receiving, via a user interface of a communication apparatus, a set of parameter values of a moisture sensor. The method may further include configuring, by a sensor response control component, the moisture sensor with the set of parameter values. The moisture sensor may generate a moisture notification based on the set of parameter values provided via the user interface.

A computer readable medium may also be provided that contains instructions to specify, via a user interface, settings associated with moisture detection in a communication apparatus. The computer readable medium may also contain instructions to output, via the user interface, a user notification in response to the moisture detection. The instructions may further receive, via the user interface, a user selection in response to the user notification. The computer readable medium may further contain instructions to shut down a first power source of the communication apparatus and continue operation of a second power source of the communication apparatus based on the user selection.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
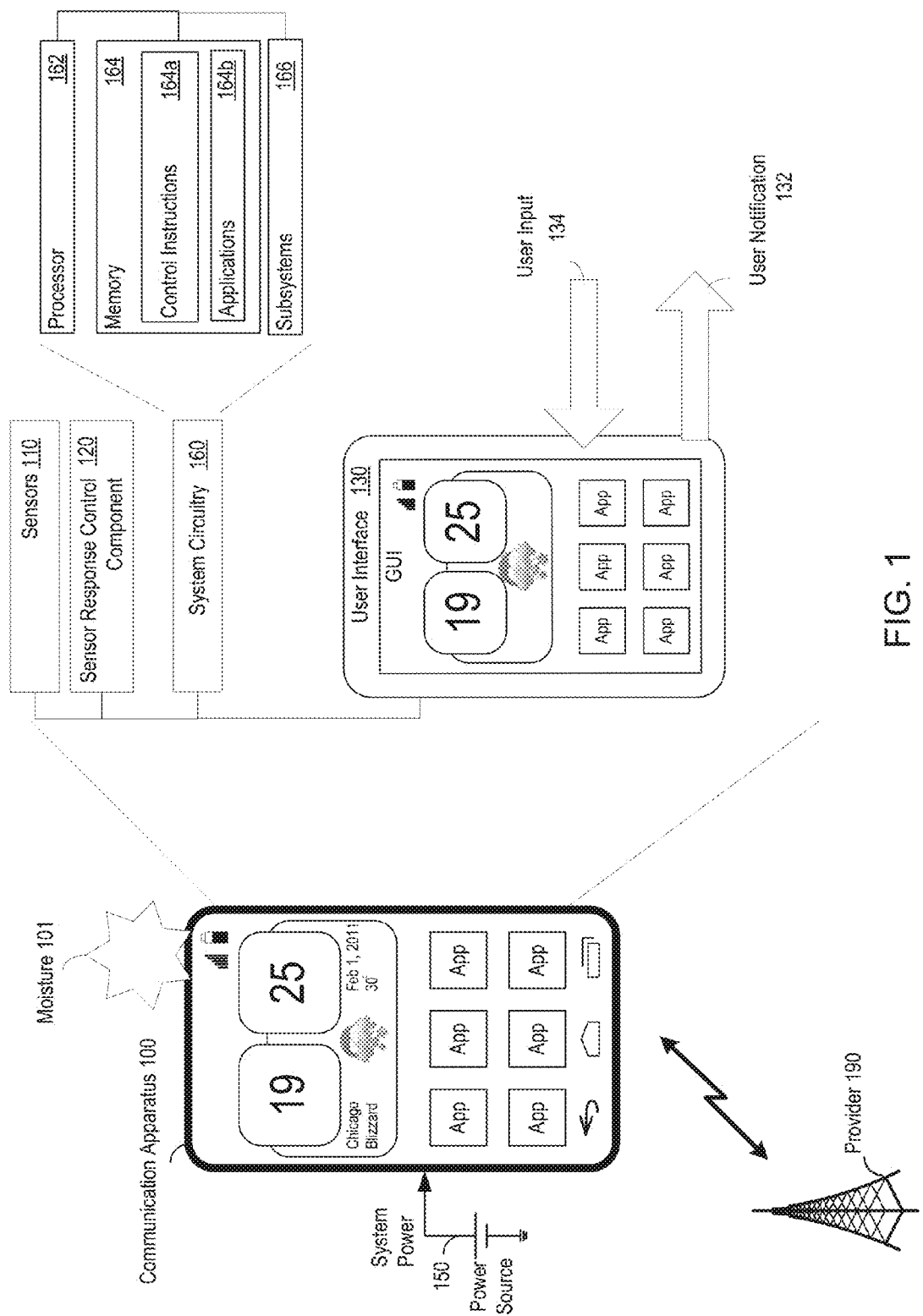
FIG. 1 illustrates an example of a communication apparatus.

In one example, a communication apparatus may be equipped with one or more sensors. The sensors may enable detection of changes in and/or around the communication apparatus. The changes detected may be changes in moisture, light, height, pressure, sound, temperature, and/or any other physical condition, and/or changes in an attribute or a parameter associated with the communication apparatus and/or surroundings. Alternatively or in addition, the sensors may enable detection of changes in the communication apparatus itself. For example, the changes detected may be changes in voltage, current, resistance, capacitance, inductance, temperature, or any other attribute, or parameter, associated with the communication apparatus itself. The detection by the sensors may be used to proactively detect a possible mishap, or accident, or damage that may happen to the communication apparatus. In response to such events, the communication apparatus may be configured to shut down as a default option. For example, the communication apparatus may be configured to shut down in response to a change in moisture detected by one or more of the sensors.

A technical advantage of the technical solutions described throughout the present document may be that a response, or an action, or a step, performed responsive to changes detected by the sensors may be customized. The customization may be constrained, or limited, or categorized, for different entities, or stake holders, associated with the communication apparatus. Another technical advantage of the technical solutions described may be that an end-user may override manufacturer's or provider's settings associated with the sensors in the communication apparatus, so that detection of changes and generation of events are customized according to usage and/or desire of the end-user.

One or more technical solutions described below may enable activating or powering one type of sensor in response to a change detected by another type of sensor. For example, the end-user may customize the dependence of the sensor detections resulting in an efficient and customizable usage of power, such as battery power, consumed by the communication apparatus. The end-user may accordingly use the power more efficiently, as suited to his/her usage of the communication apparatus by turning one or more sensors off until detection of an event by another set of sensors.

Another technical advantage of one or more of the technical solutions described throughout the present document may be that in response to changes detected by the sensors, the communication apparatus may continue to operate so that an end-user is not left stranded without a communication device, for example, in emergency situations.

Yet another technical advantage of one or more of the technical solutions described throughout the present document may involve restoring the communication apparatus from a shutdown operation that was performed in response to an earlier sensor event, such as moisture detection. The technical solutions described may enable the end-user to restore the communication apparatus without involving the manufacturer or the provider of the communication apparatus or any other third party.

An apparatus may gather and/or record data associated with humidity/moisture detection. The data may include moisture level, timestamps, state of the apparatus and/or a component of the apparatus. For example, a mobile device may gather and store humidity/moisture related data. The mobile device may store the data on a storage device of the mobile device, or on a device in a remote location, such as on a server. The manufacturer, service provider, and/or a third party may access the data. An end-user of the mobile device may authorize who can access the data. For example, the end-user may permit access via a website, an application, or any other user interface. Once authorized, the manufacturer, service provider, or third party may analyze the data. For example, the analysis may predict device failure and/or monitor usage of the device. (for manufacturer & provider), In another example, that analysis may provide verification of warranty, such as compliance with warranty conditions. In another example, a data analyzer may access data associated with multiple apparatus to detect and/or identify trends. For example, the data analyzer may analyze the moisture data from multiple users to provide weather related information via a website, an application, and/or any other information source.

The present document describes various other technical solutions and advantages, which will be evident to a person skilled in the art upon reading the present document.

FIG. 1 illustrates an example of a communication apparatus 100. The communication apparatus 100 may be an apparatus that communicates with an end-user of the apparatus, such as via a user interface. Alternatively or in addition, the communication apparatus 100 may communicate with other devices over one or more communication networks. The communication apparatus may be in the form of a mobile device, a mobile phone, a smart phone, a personal digital assistant, a camera, a marine radio, a navigation system (such as a global positioning system), a media player, a tablet computer, a laptop, a desktop, or any other computing device.

The communication apparatus 100 may include one or more sensors 110, a sensor response control component 120, a user interface 130, a power source 150, and a system circuitry 160. The communication apparatus 100 may send/receive data via wired or wireless communication signals. The communication signals may be sent to or received from a network provided by a provider 190, such as a mobile carrier, Wi-Fi provider, satellite communication provider, or any other communication signals provider. The communication apparatus 100 may include more, fewer, or different elements, or components. For example, the communication apparatus 100 may also include speakers. In another example, the communication apparatus 100 may include mechanical buttons, capacitive buttons, and/or other user interactive receptacles. In yet another example, the communication apparatus may include another power source. Some or all of the components of the communication apparatus 100 may communicate with each other. The communication may be via a wire, a bus, or any other wired or wireless communication link.

The power source 150 may provide power for operation of the components of the communication apparatus 100. The power source 150 may be electric cable plugged into a power outlet or any other external power source, such as a battery pack, a solar cell, a computer, a Universal Serial Bus (USB) hub. Alternatively or in addition, the power source 150 may be a battery, an integrated solar cell, or any other internal power source.

The system circuitry 160 may include a processor 162, a memory 164, and one or more subsystems 166. The processor 162 may be a central processor of the communication apparatus 100 responsible for execution of an operating system, control instructions, and/or one or more applications installed on the communication apparatus 100. The processor 162 may be one or more devices operable to execute logic. The logic may include computer executable instructions or computer code embodied in the memory 164 or in other memory that when executed by the processor 162, cause the processor 162 to perform the features implemented by the logic. The computer code may include instructions executable with the processor 162. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. Examples of the processor 162 may include a general processor, a central processing unit, an application specific integrated circuit (ASIC), a digital signal processor, a field programmable gate array (FPGA), a digital circuit, an analog circuit, or any combinations thereof. The processor 162 may be in communication with the memory 164 and the subsystems 166. In one example, the processor 166 may also be in communication with additional elements, such as the user interface 130, sensors 110, and the sensor response control component 120. In some examples, the sensor response control component 120 may be included in the memory 164 of the system circuitry 160; the sensor response control component 120 may include no processor; and the sensor response control component 120 may include instructions executable by the processor 160 of the system circuitry 160.

The memory 164 may be a non-transitory computer storage medium. Examples of the memory 164 may include random access memory, such as dynamic random access memory (DRAM), static random access memory (SRAM), Flash memory, read only memory (ROM) or any other type of memory or a combination thereof. The memory 164 may store control instructions 164a and applications 164b executable by the processor 162. The control instructions 163a and the applications 164b may be stored on the memory 164 by, for example, the manufacturer, provider, or end-user of the communication apparatus 100. The memory 164 may contain other data such as images, videos, documents, spreadsheets, audio files, or data associated with operation of the communication apparatus 100.

The subsystems 166 may include circuitry, such as a processor, a memory, a communication interface, an integrated circuit, an antenna, a resistor, a capacitor, and/or any other hardware component. The processor or processors in the subsystems 166 may be a multimedia processor, a graphics processor, an audio processor, a digital signal processor, a microcontroller, or any other processor. The processors may be in communication with one or more other processors, such as the processor 162 of the system circuitry 160. Alternatively or in addition, any processor in the subsystems 166 may be part of, or be substituted by, one or more other processors in the communication apparatus 100. The subsystems 166 may also include software. For example, the subsystems 166 may include instructions and/or data stored in memory. The instructions and/or data may control operations of the subsystems 166 when executed by a processor. The instructions may be computer executable. The data may include parameters and/or preset conditions associated with the subsystems 166. In some examples, the subsystems 166 may each be independently disabled and/or enabled by other components of the communication apparatus 100, such as the sensor response control component 120.

The subsystems 166 may each enable one or more operations of the communication apparatus 100. For example, the subsystems 166 may include a voice communications subsystem. The voice communication subsystem may enable voice communication related operations of the communication apparatus 100 over voice channels. The voice communication related operations may include, for example, making/receiving telephone calls. The voice communication subsystem may include one or more antennas, radios, and/or any other components for the voice communication related operations. The subsystems 166 may include a data subsystem. The data subsystem may enable, for example, transmission/reception of data over data channels such as 3G, 4G, 4G LTE, Wi-Fi, and any other data channel. The data subsystem may include a media subsystem in some examples. The media subsystem may include a graphics processing unit (GPU), a video processing unit, an audio processing unit, an image capture and render unit, and/or any other components used for media processing. The media subsystem may enable an end-user to render and watch videos, images, audio, and other media on the communication apparatus 100. The subsystems 166 may include fewer, more, and/or different subsystems than those described. The described subsystems are examples from several possible subsystems.

The user interface 130 may be a component that enables the end-user to interact with the communication apparatus 100 and/or one or more of the components of the communication apparatus 100. The user interface 130 may communicate one or more user notifications, such as a user notification 132, to the end-user and/or receive one or more user inputs, such as a user input 134, from the end-user.

The user notification 132 may be an output of the user interface 130. The user notification 132 may be an indication to the end-user. The end-user may or may not respond to the user notification 132. The user notification 132 may be a visual notification, an audible notification, a vibration notification, or any other type of an indicative action to communicate information to the end-user. For example, the user notification 132 may be a beep, a vibration, a flashing of a light, a screen pop-up, or any other alert or a combination thereof. The user notification 132 may involve changing brightness of a display, changing volume of a speaker, and/or altering settings of other components of the communication apparatus. The user notification 132 may be provided via an auxiliary device, such as a watch, headphones, or another device in communication with the communication apparatus 100.

The user input 134 may be a user command. The user input 134 may indicate the end-user's desire to perform one or more actions with the communication apparatus 100, such as place a telephone call, play a media file, send a text message, browse a webpage, start an application, change settings, or any other action or a combination thereof. The user input 134 may be a text command, a voice command, a gesture based command, or any other form of information received from the end-user. For example, the user input 134 may be a click, a text entry, a touch, a voice entry, a button press, a hover, a head movement, and/or any other user interaction. The user input 134 may be received in response to the user notification 132, in which case the user input 134 may be referred to as a user response. Alternatively or in addition, the user input 134 may not be received in response to the user notification 132, rather the end-user may provide the user input 134 independently of the user notification 132.

The user interface 130 may be a graphical user interface (GUI), an audio interface, a command line interface, and/or any other type of a user interface. The graphical user interface may include visual elements, such as a button, a text box, a hyperlink, a label, a shape, an image, and/or any other type of visual element. One or more of the visual elements may receive the user input 134. Alternatively or in addition, one or more of the visual elements may not receive the user input 134.

The user interface 130 may include one or more input and/or one or more output devices. The user interface 130 may include, for example, a display, a speaker, a microphone, a vibration controller, a light emitting device (such as a light emitting diode), and/or any other component. The display may be touch screen enabled. The user interface 130 may include additional, fewer, or different devices than those illustrated in FIG. 1. For example, the user interface 130 may include an antenna, a microphone, a case, and/or any other component that may enable user interaction. The user interface 130 may include circuitry, such as a processor, a memory, a communication interface, an integrated circuit, an antenna, a resistor, a capacitor, and/or any other hardware component. The user interface 130 may also include software. For example, the user interface 130 may include instructions and/or data that may be stored on computer readable memory. The instructions and/or data may control operations of the user interface 130. The instructions may be computer executable. The data may include parameters and/or preset conditions associated with the user interface 130.

The user interface 130 may receive communication signals from the sensors 110 and/or the sensor response control component 120. The received communication signals may be instructions, requests, and/or data. For example, the display may receive instructions from the sensor response control component 120 to render an image. The image to be rendered may be communicated as data to the display. Alternatively, the image to be rendered may be stored in memory and the data communicated may indicate a location, such as a relative path, or a memory address of the image on the memory. Further, the user interface 130 may receive a request for current state or any other information related to the user interface. For example, a current state of the speaker may be inquired by the sensor response control component 120. Similarly, instructions, requests, and/or data, may be sent/received from the user interface 130. The communication signals may be sent and/or received from the user interface 130.

The sensors 110 may include a sensor or a combination of sensors such as a location sensor, an impact sensor, a drop sensor, an accelerometer, a camera, a touch sensor, a light sensor, a moisture sensor, a gyroscope, a thermometer, a compass, a pressure sensor, and other sensors. The sensors 110 may include more or fewer sensors than those shown and/or listed. The sensors 110 may include circuitry, such as a processor, a memory, a communication interface, an integrated circuit, an antenna, a resistor, a capacitor, and any other hardware component. The sensors 110 may also include software. For example, the sensors 110 may include instructions and/or data that may be stored on memory. The instructions and/or data may control operations of the sensors 110. The instructions may be computer executable. The data may include parameters and/or preset conditions associated with the sensors 110. The communication apparatus 100 may include one or more of the same type of sensors. For example, the communication apparatus 100 may have multiple moisture sensors and one accelerometer. Other combinations of the number of sensors are possible.

The sensors 110 may detect changes in the communication device itself or in the surroundings in proximity of the communication device 100. The sensors 110 may indicate such a change to other components of the communication apparatus 100, such as the user interface 130 and/or the sensor response control component 120. The indication may be provided in form of an "event." The event may be a signal, an interrupt, or a trigger, or any other form of notification transmitted to the other components of the communication apparatus 100. The event may also be referred to as a detection or a notification.

For example, in response to detection of moisture 101 by a moisture sensor, a moisture event may be generated. The moisture event may be a signal or an indication of a change in the moisture 101. The moisture sensor may detect a level of the moisture 101 and/or a change in the moisture 101 in and/or around the communication apparatus 100. The moisture sensor may include one or more of the sensors 110 and/or additional components of the communication apparatus 100. The moisture sensor may be an integral part provided by the manufacturer of the communication apparatus 100. Alternatively or in addition, the moisture sensor may be a third-party component, such as an after-market component.

The moisture sensor may generate the moisture event in response to a change in moisture level, or in response to a rate of change in moisture exceeding a preset threshold value, or in response to any other factor related to the moisture 101 in and/or around the communication apparatus 100. The moisture event may be generated when the moisture level increases and/or when the moisture level decreases. The moisture level may change, for example, when the communication apparatus 100 is immersed in (or taken out of) a fluid, such as water, juice, milk, coffee, tea, alcohol, carbonated drinks, or any other substance that may affect the moisture level. Alternatively or in addition, the moisture level may change when the communication apparatus is brought in proximity to, or moved away from, an object. Examples of such an object may include a container with fluid, a body part (such as a head, hands, and/or an ear), a toilet bowl, or any other object. Alternatively or in addition, the moisture level may change when the moisture level or humidity in the surroundings changes, such as when the climate changes, a geographic location of the communication apparatus 100 changes, or any other such change. For example, a change in weather from a dry day to a rainy day may cause the moisture level to increase, and vice versa. In some examples, transportation of the communication apparatus 100 from a relatively arid area, such as land, to a humid area, such as sea, lake, river, or any other water body, may cause a change in moisture level.

The moisture event may be generated based on a rate of change in the moisture 101 that is in proximity to the communication apparatus 100, instead of based simply on a change in moisture level that is in proximity to or within the communication apparatus 100. As used throughout the present document, "proximity" to the communication apparatus 100 refers to a space that may be immediately adjacent to the communication apparatus 100. Alternatively or in addition, the proximity may be a space within a predetermined range of the communication apparatus 100, such as within zero (0) meters to ten (10) meters of the communication apparatus 100.

Different sensors may have different proximities respectively. For example, some moisture sensors may detect the moisture event within 3 inches of the communication apparatus 100 while some temperature sensors may detect a temperature event within 2 meters. An internal portion of the communication apparatus 100 may be considered in the proximity of the communication apparatus 100 in some examples. The proximity ranges provided above are examples and other proximity ranges are possible.

The sensors 110 may record data associated with the moisture event. For example, the data associated with the moisture event may contain one or more parameters detected by one or more of the sensors 110 that resulted in the moisture event. Alternatively or in addition, the data may contain a location, a height, an acceleration measurement, an impact force, a temperature, and/or other information that the sensors 110 may detect. The data may also contain a timestamp indicative of the occurrence of the moisture event. The data may further contain a state of one or more applications 164b and/or other subsystems of the communication apparatus 100. The end-user may be able to choose what data should be collected. The data may be recorded in the memory 164. The end-user may be able to specify a location where the data is to be stored in some examples. In some examples, the end-user may be able to specify whether to share data with the manufacturer and/or provider, and if so, what data to share. The data associated with the moisture sensor may be referred to as moisture data. The moisture data may include data associated with one or more moisture events. The end-user may specify a number of moisture events for which to record corresponding data. For example, the end-user may specify recording moisture data for past 10 (ten) moisture events.

The sensors 110 may detect and generate events associated with changes in attributes other than moisture, such as light, noise, temperature, height, acceleration, gravity, or the like. For example, a drop sensor and/or an accelerometer may detect a drop, or fall, of the communication apparatus 100 that may be captured in a drop event, or drop notification. Alternatively or in addition, detection of changes in attributes and generation of events may be performed using one or more components of the communication apparatus. For example, a change in the moisture 101 may be detected using one or more components of the communication apparatus 100, such as an antenna, a microphone, touch screen, or any other component.

Figure 2:
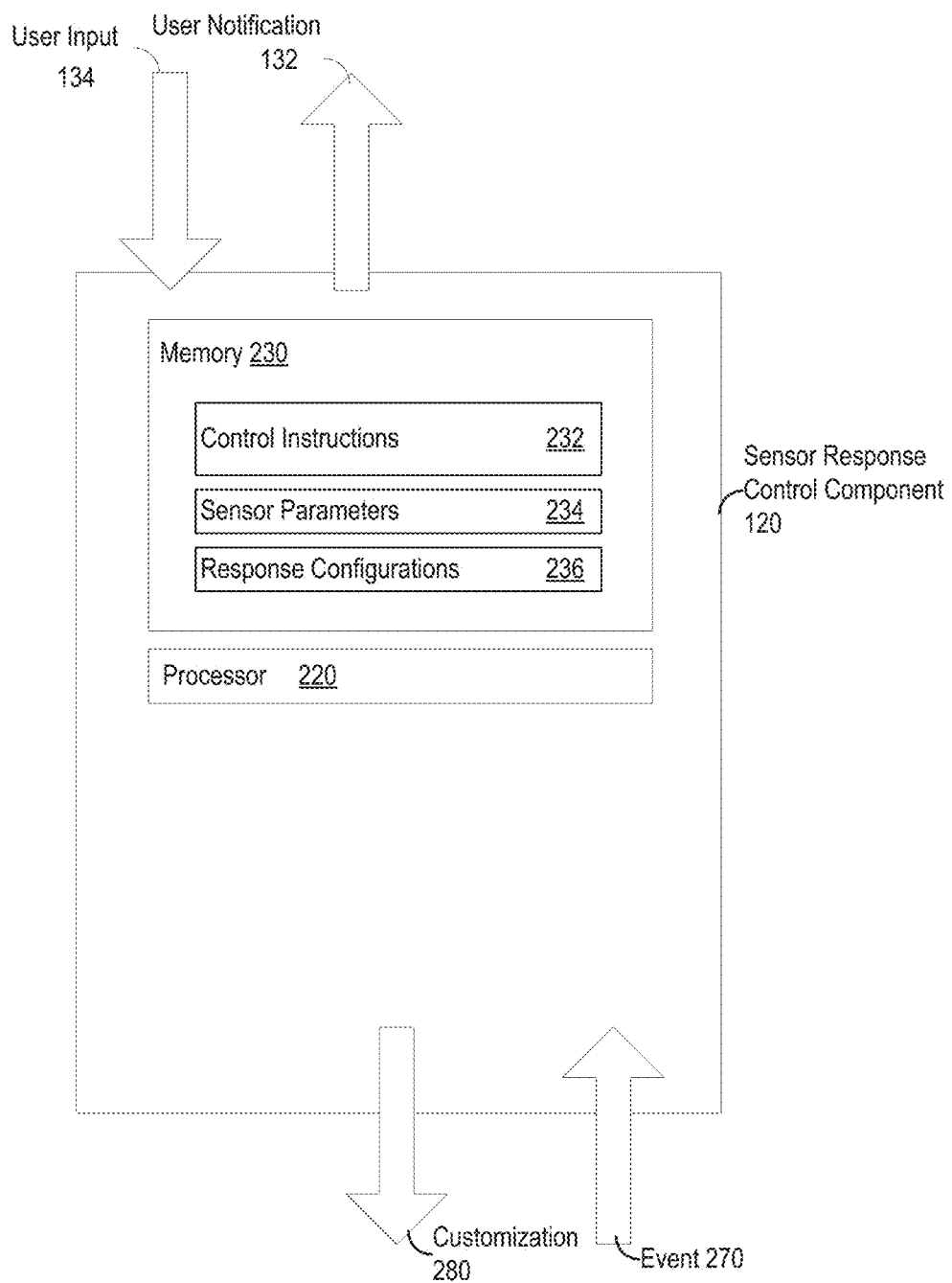
FIG. 2 illustrates an example sensor response control component.

FIG. 2 illustrates an example sensor response control component 120. The sensor response control component 120 may be any component that responds to and/or controls one or more of the sensors 110. The sensor response control component 120 may include hardware components such as a processor 220 and a memory 230. In some examples, the sensor response control component 120 may be part of the system circuitry 160. In some examples, the processor 220 may be the processor 162, and the memory 230 may be the memory 164. The sensor response control component 120 may include fewer, different, or additional components than illustrated in FIG. 2.

For example, the sensor response control component 120 may include integrated circuits, antennas, resistors, capacitors, and/or any other hardware components. The sensor response control component 120 may also include software. For example, the sensor response control component 120 may include control instructions 232 and/or data that may be stored in the memory 230. The instructions 232 and/or data may control operations of the sensor response control component 120. The instructions 232 may be computer executable instructions. The data may include parameters 234 and/or preset conditions associated with the sensor response control component 120. The parameters 234 may be associated with the sensors 110, such as parameters and/or threshold values that the sensors 110 use to detect changes and/or generate events. The data may further contain response configurations 236. The response configurations 236 may be user settings that are specified by the end-user, provider, or manufacturer, of the communication apparatus 100. The response configurations 236 may specify actions to be performed by the sensor response control component 120 in response to events generated by the sensors 110.

The processor 220 may be one or more devices operable to execute logic. The logic may include computer executable instructions 232 or computer code embodied in the memory 230 or in other memory that when executed by the processor 220, cause the processor 220 to perform the features implemented by the logic. The computer code may include instructions executable with the processor 220. The computer code may be written in any computer language now known or later discovered, such as C++, C#, Java, Pascal, Visual Basic, Perl, HyperText Markup Language (HTML), JavaScript, assembly language, shell script, or any combination thereof. The computer code may include source code and/or compiled code. Examples of the processor 220 may include a general processor, a central processing unit, an application specific integrated circuit (ASIC), a digital signal processor, a field programmable gate array (FPGA), a digital circuit, an analog circuit, or combinations thereof. The processor 220 may be in communication with the memory 230. In one example, the processor 220 may also be in communication with additional elements, such as the user interface 130, the sensors 110, and the system circuitry 160.

The sensor response control component 120 may receive events, such as an event 270, generated by one or more of the sensors 110. A sensor among the sensors 110 may indicate a change in an attribute the sensor detects. The indication may be provided in form of the event 270. For example, the event 270 may be a moisture event from one or more moisture sensors. Alternatively or in addition, the event 270 may be a drop event from one or more drop sensors. The event 270 may be a communication signal generated by the sensors 110. In other examples, the event 270 may be a communication packet. The sensors 110 may transmit the event 270 for receipt by one or more components of the communication apparatus 100. For example, the sensors 110 may transmit the event 270 for receipt by the sensor response control component 120.

The sensors may associate the event 270 with data from the components of the communication apparatus 100 at the time the event 270 is generated. The data associated with the event 270 may be included in the transmission of the event 270. Alternatively or in addition, the sensors 110 and/or the components of the communication apparatus 100 may transmit the data associated with the event 270 as part of a separate transmission. In other examples the data associated with the event 270 may be recorded.

The sensor response control component 120 may transmit a customization 280 to one or more of the sensors 110. The customization 280 may be a communication transmitted by the sensor response control component 120 for receipt by the sensors 110. The customization 280 may be a communication signal and/or a communication packet. Alternatively or in addition, the customization 280 may be multiple communication signals and/or packets. Alternatively or in addition, the customization 280 may be a configuration value of one or more of the sensors 110.

The sensor response control component 120, via the customization 280, may configure the sensors 110. The configuration may include an indication of when an event is generated by the sensors 110, and/or how to respond to the event 270 generated by one or more of the sensors 110. For example, the customization 280 may include a set of parameter values and/or settings for the sensors 110. Alternatively or in addition, the customization 280 may be parameter values and/or settings for a sensor among the sensors 110. For example, the customization 280 may include a sensitivity setting for the moisture sensor. Alternatively or in addition, the customization 280 may include a threshold value to trigger a moisture event by the moisture sensor. Alternatively or in addition, the customization 280 may include both the sensitivity and the threshold value for the moisture sensor. The sensor response control component 120 may generate the customization 280 based on the parameter values and/or settings specified by the end-user via the user interface 130.

The sensor response control component 120 may also transmit the user notification 132. The transmitted user notification 132 may be received by the user interface 130. The user notification 132 may include an instruction, a request, or data to operate the user interface 130. Alternatively or in addition, the user notification 132 may include information that the user interface 130 is to communicate to the end-user. The sensor response control component 120 may also receive the user input 134 from the user interface 130. The user input 134 may contain information regarding responding to the event 270. For example, the user input 134 may include a selection of an option provided to the end-user. The option may determine actions to be performed by the sensor response control component 120 in response to the event 270.

The event 270 generated by the sensors 110 may be received by the sensor response control component 120. The event 270 may be a moisture event from one or more moisture sensors. The event 270 may be analyzed by the sensor response control component 120. Based on the analysis, the sensor response control component 120 may detect a mishap or an accident that is about to occur, or is currently occurring, to the communication apparatus 100. In response to the event 270, the communication apparatus 100 may be configured to be shut down. For example, the sensor response control component 120 may shut down power supplied to all components of the communication apparatus 100. For example, shutting down power may include shutting off, or switching off, or powering off, or disconnecting, the communication apparatus 100. In some examples, shutting down the power may include disabling operations of the communication apparatus 100, for example by putting the communication apparatus in a stand-by mode. Alternatively or in addition, shutting down the power may include disconnecting a power supply of the communication apparatus 100.

The sensor response control component 120 may alternatively, or in addition, enable customization of the events generated by the sensors 110. For example, the sensor response control component 120 may transmit the customization 280 to one or more of the sensors 110 in order to customize one or more of the sensors 110 and/or the events generated by the sensors 110. For example, the customization 280 may specify a set of parameter values. The sensors 110 may generate the event 270 based on the set of parameter values. For example, the set of parameter values may contain one or more threshold values associated with the moisture sensor. The moisture sensor may generate the moisture event, or a moisture notification, in response to the threshold values of the set of parameter values being exceeded.

In an example, the event generated by the sensors 110 may be based on a rate of change of an attribute. In one example, the moisture event may be generated when a level of moisture in proximity of the communication apparatus 100 changes at a rate higher/lower than a preset rate. The customization of the preset rate may prevent the moisture event from being generated unnecessarily, such as when the communication apparatus 100 is moved knowingly from a relatively lower (or higher) moisture zone to a higher (or lower) moisture zone. For example, if the communication apparatus is moved from a basement (more humid zone) to second level of a building (less humid zone). In another example, the communication apparatus 100, which may be a military communication apparatus, such as a marine radio, which may be moved from an arid environment (such as a desert) to a more humid environment (such as regulated environment within a home, office, plane), or from land on to a boat, or other such cases. Without configuration of the moisture event generation of the sensors 110, the communication apparatus 100 may generate the moisture event in all such instances, and in some examples, be shut down in response to the moisture event. The sensor response control component 120 may, instead, enable customization of the preset rate of change of moisture that triggers the moisture event.

Alternatively or in addition, the sensor response control component 120 may customize responses to the events. The end-user may select actions that are to be taken in response to a generated event. For example, the customization 280 may enable output of the user notification 132 to the end-user of the communication apparatus 100. Thus, in the above example of the moisture event, instead of shutting down or disabling the communication apparatus 100, the end-user may be notified of the moisture event by the user notification 132. The end-user may decide to ignore the user notification 132, or take further action in response to the user notification 132. Ignoring the user notification 132 for longer than a predetermined length of time may result in a set of actions to be performed by the sensor response control component 120. The set of actions may include shutting down the communication apparatus completely or partially. The set of actions may be predetermined by the manufacturer or by the end-user. Alternatively, the sensor response control component 120 may provide the end-user with options to choose or select from, via the user interface 130, in response to the moisture event. The options may be provided as part of the user notification 132. The sensor response control component 120 may then perform actions according to the option selected by the end-user via the user interface 130.

The sensor response control component 120 may enable configuration of threshold values, and/or responses associated with events generated based on any attributes sensed, tracked, or monitored, by the sensors 110. For example, the sensor response control component 120 may enable customization of an event or a response to the event generated by the location sensor, impact sensor, drop sensor, accelerometer, camera, touch sensor, light sensor, moisture sensor, gyroscope, thermometer, compass, pressure sensor, and/or other sensors that may be included in the sensors 110 of the communication apparatus 100. The sensor response control component 120, via the user interface 130, may generate a customization screen, such as a user interaction screen, an image, and/or a graphical user interface that enables customization of the sensors 110, the event 270 generated by the sensors 110, and the response 290 to the event 270 generated by the sensors 110.

The customization screen may be displayed via the display. Alternatively or in addition, the customization screen may be displayed via a display that is external to the communication apparatus 100. For example, the external display may be communicably connected to the communication apparatus 100 via a communication port, such as a Universal Serial Bus (USB) port, or a micro-USB port, or any other communication link. Alternatively or in addition, the external display may be communicably connected to the communication apparatus 100 wirelessly. In another example, the customization may be performed via audio interactions. For example, a customization setting, and/or configuration may be provided as an audio command via a microphone connected to the communication apparatus 100.

Figure 3:
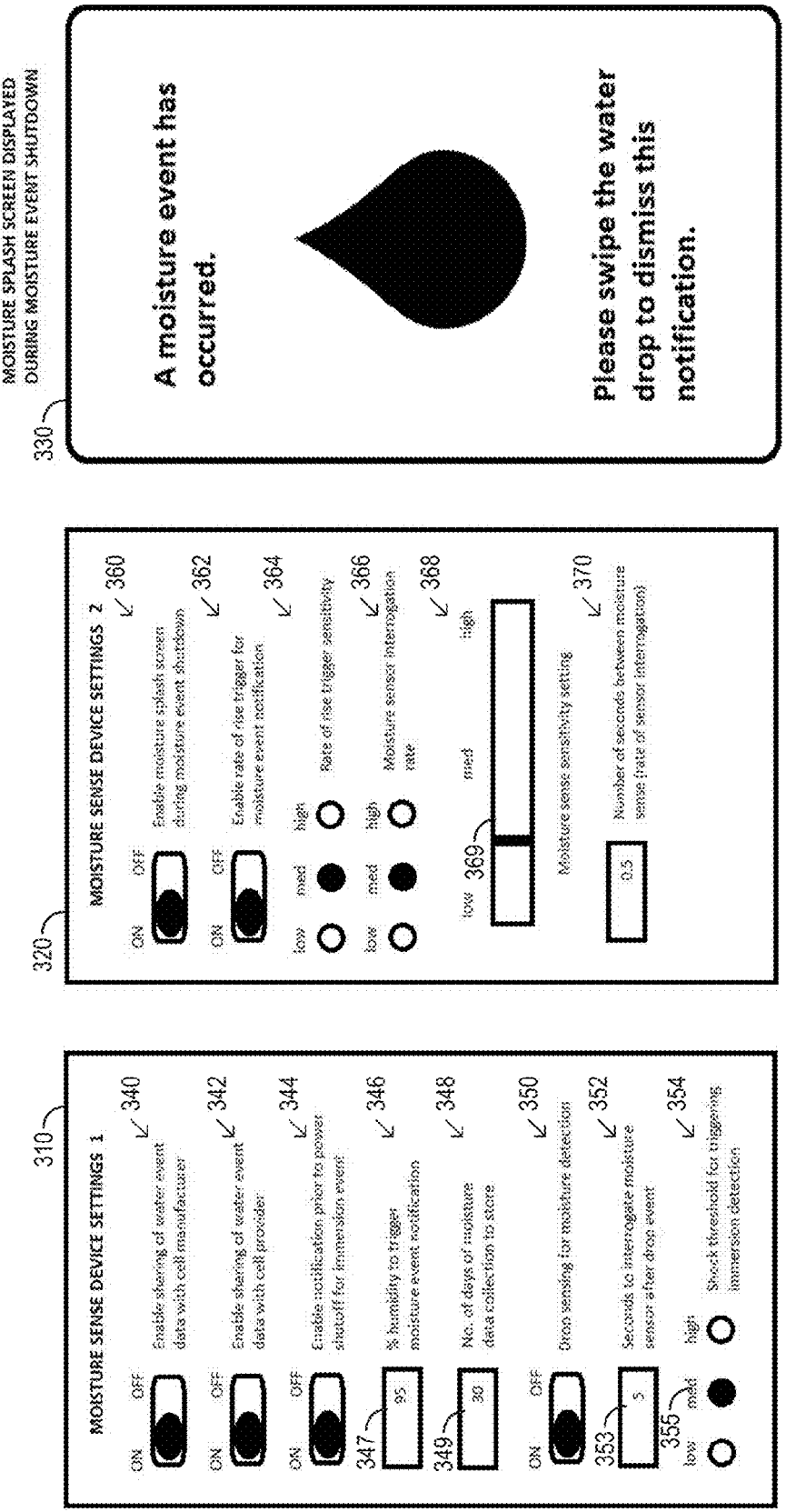
FIG. 3 illustrates example customization screens.

FIG. 3 illustrates example customization screens 310 and 320. The customization screen 310 or 320 may be displayed to customize the sensors 110, an event generated by the sensors 110, and/or a response to the event generated by the sensors 110. The customization screens 310 and 320 may be accessible, for example, via a settings menu of the communication apparatus 100, a web-page, or an application executed on the communication apparatus. Alternatively or in addition, the customization screens 310 and 320 may be accessed via another communication apparatus. The communication apparatus 100 may then be selected for customization, so that settings for the sensors 100 of the communication apparatus 100 may be specified. Other ways to access a customization screen are possible.

Any of the customization screens 310 and 320 may include one or more interaction controls or user input controls 340-370. The interaction controls may be any of the user input control 340-370 operable to receive a selection signal by the end-user, such as an <HREF> element in HTML, a button, a slide bar, a text box, a combo box, a radio button, a slide button, an image, a tab, or any combination thereof. The selection signal may be received from a user input device such as a touch screen, a keyboard, a mouse, a joystick, a trackball, a button, a microphone, or any other user input device or a combination thereof. Any other type of user input control and/or user input device may be included in the user interface 130 and/or in the communication apparatus 100.

The sensor response control component 120 may monitor interactions of an end-user with a customization screen in order to identify and/or determine the customization 280 to be sent to the sensors 110. The customization screen may provide options to specify settings for the sensors 110. The customization screen may also provide settings to customize the event 270 and/or the response(s) to the event 270. For example, a customization screen may enable specifying when the moisture event should be generated. The customization screen may further enable configuration of actions to be performed in response to the moisture event.

The exemplary customization screens 310 and 320 shown in FIG. 3 may include user interaction controls 340-370 to enable, disable, or configure various parameters or settings associated with the moisture event. For example, the customization screens 310 may enable an end-user of the communication apparatus 100 to determine accessibility, or sharing, of data associated with the moisture event via user input controls 340 and 342. For example, the user input control 340 may enable sharing of data associated with the moisture event with a manufacturer of the communication apparatus 100. The manufacturer may be the warranty provider of the communication apparatus 100, and may place a constraint on such an option. For example, the manufacturer may mandate sharing data associated with a moisture event. The customization screens 310 and/or 320 may or may not enable overriding the manufacturer mandates.

In another example, the user input control 342 may enable sharing of the moisture event data with a provider of the communication apparatus 100. For example, the provider may be a wireless service provider that may provide the communication apparatus 100 to the end-user. Alternatively or in addition, the provider may be an employer, contractor, or any other entity that provides the communication apparatus 100 to the end-user. The provider may constrain configuration of the sharing, such as mandating sharing of data associated with the moisture event.

The end-user via the user input control 346 may specify a threshold moisture level 347 at which the moisture event is triggered. The threshold moisture level 347 may be specified as a percentage moisture (or humidity) level, an absolute moisture value, or in any other format. For example, a moisture level above (or below) the threshold moisture level 347 may generate or trigger the moisture event. Alternatively or in addition, the end-user may specify a sensitivity 369 of a moisture sensor via the user input control 368. The sensitivity 369 may be specified as may be specified as a quantity (numerical value, percentage), or in relative terms, such as a level, or degree (low, medium, high) via the user input control 368 such as a slider control. The selected degree may be translated into a corresponding quantity, such as a corresponding threshold moisture level.

The end-user, via the user input control 348, may specify a period of time 349 to store data associated with events such as the moisture event. The period of time 349 may be specified in number of days, or in any other unit of time. The communication apparatus 100 may delete records of the data associated with the moisture event past the specified period of time 349. For example, if the period of time 349 specified is 30 days, data associated with a moisture event that occurred within the past 30 days may be maintained, while the data associated with a moisture event that occurred earlier may be deleted and/or archived.

The user interface 130 may enable customizing sensor events of one sensor in combination with another sensor. For example, the end-user, via the user input controls 350-354, may specify parameters associated with the moisture sensor and another sensor, such as a drop sensor. The specified parameters of the other sensor may be used as threshold conditions in moisture detection, or to reconfigure the moisture sensor. The end-user may specify whether events from a drop sensor are to be used as triggers for moisture detection via the user input control 350. The end-user may specify how long to initiate immersion detection after the drop event detection, by specifying a period of time 353 via the user input control 352. Although the moisture sensor may regularly attempt to detect the moisture 101 during normal operation, the moisture sensor may not attempt moisture detection frequently enough to avoid damage to the communication apparatus 100 if the communication apparatus 100 is immersed in liquid. Immersion detection may be a process in which the moisture sensor and/or other sensors attempt to detect the moisture 101 more frequently than during the normal operation of the communication apparatus 100. The moisture sensor may perform immersion detection during the period of time 353 after the drop event detection. The end-user may specify a drop sensor threshold condition associated with the drop sensor that initiates the immersion detection. For example, the end-user may specify a shock value 355 via the user input control 354. The end-user may specify the shock value as low, medium, or high. Alternatively, in other examples, the end-user may specify the shock value as a quantity. The shock value 355 may indicate a threshold level of shock, which when the communication apparatus 100 experiences a shock that exceed the threshold level, the immersion detection is activated.

The customization screen 310 and/or 320 may enable an end-user to delay disabling or shutting down power to one or more components and/or subsystems of the communication apparatus 100 in response to the moisture event. Alternatively or in addition, the customization screen 310 and/or 320 may enable an end-user to prevent shutting down of the device in response to a moisture event. Instead of shutting down or disabling some or all operations of the communication apparatus 100, the sensor response control component 120 may provide a notification, such as the user notification 132, to the end-user. The end-user may specify options regarding the user notification 132 via the user control 344 and/or 360. For example, the end-user may specify that a user notification 132 is to be provided before shutting down the communication apparatus 100. The end-user may be able to prevent the communication apparatus 100 from shutting down in response to the user notification 132. For example, a notification screen, such as 330 may be displayed that indicates that the moisture event was generated. Alternatively or in addition, an audio notification, a vibration notification, or a flashing of a light, or any other alert or a combination thereof may be provided as part of the notification.

The user notification 132 received may be customized by the end-user. For example, the end-user may select one or more of the alerts to be provided as part of the notification. The end-user may also customize each alert, such as a particular tone, tune, or sound, to be played as the audio alert, or an image to be displayed as part of the notification screen 330. The end-user may also select a splash screen of his or her choice to be displayed in case the communication apparatus 100 is shut down or disabled in response to the moisture event. Alternatively or in addition, the end-user may customize the notification screen 330 that is displayed in response to a moisture event. Further, a splash screen selected by the end-user may be displayed as the communication apparatus 100 restarts after being shut down due to the moisture event.

Figure 9:
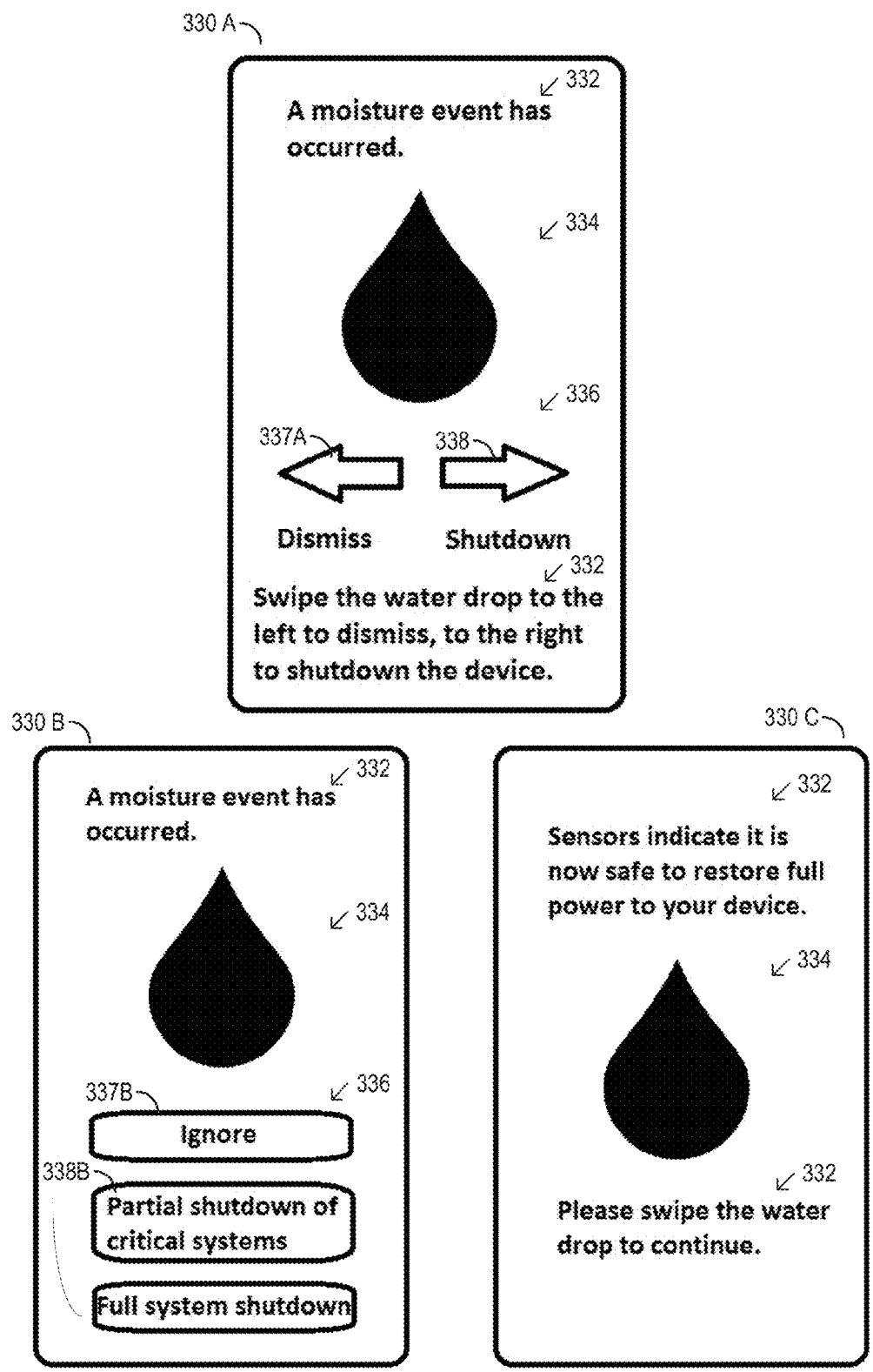
FIG. 9 illustrates example notification screens.

FIG. 9 illustrates example notification screens 330A-330C that may be displayed in response to a moisture event or to moisture detection. The notification screens 330A-C may include a text element 332, an image 334, and a user input control 336. The notification screens 330A-C may include may include more, fewer, or different elements, or components. The text element 332 may be a user interface element that displays text. The end-user may interact with the text element 332 to provide user input 134. For example, the end-user may enter and/or modify text displayed in the text element 332. Alternatively or in addition, the user input may be a click, a double-click, a hover, or any other type of user input 134. The end-user may specify the text to display in the text element 332. Alternatively or in addition, the text displayed may be predetermined.

The image 334 may be a user interface element that displays an image. The image 334 may be an image in any format, such as Joint Photographic Experts Group (JPEG) image, Graphics Interchange Format (GIF), Portable Network Graphics (PNG), and/or any other format. The end-user may interact with the image element 334 to provide user input 134. For example, the user input may be a click, a double-click, a hover, or any other type of user input 134. For example, the end-user may 'swipe' the image 334 displayed in the notification screen 330C to restart the communication apparatus 100 after the communication apparatus has recovered from a moisture detection. A 'swipe' may be a type of user input 134 that involves the end-user moving a swiping gesture using a user input device. The swiping motion may be sideways, top-to-bottom, diagonal, or in any other direction. The end-user may specify the image 334 and/or the user input 134 to be performed on the image 334. Alternatively or in addition, the image 334 displayed may be predetermined.

The user input control 336 may enable the end-user to make a selection regarding a set of actions to be performed. For example, the end-user may dismiss the notification by providing appropriate user input 134 according to the user input control 336. For instance, in response to the notification screen 330A, the end-user may select a user input control 337A to dismiss the notification screen 330A and continue with the operation of the communication apparatus 100. Alternatively, the end-user may select a user input control 338A to shut down the communication apparatus 100 in response to the moisture as notified by the notification screen 330A. In another example, such as in the notification screen 330B, the end-user may select a user input control 337B to dismiss the notification screen 330B and continue with the operation of the communication apparatus 100. Alternatively, the end-user may opt to shut down the communication apparatus 100 completely or partially using the user input controls 338B. The notification screens 330A-330C are examples and many other configuration of the notification screens may be possible.

The sensor response control component 120 may monitor time elapsed since the user notification 132 is provided and/or generated. For example, the user notification 132 may display the notification screen 330. In case the notification is not attended to by the end-user within a preset time interval, the sensor response control component 120 may perform, or initiate, a default set of actions. The preset time interval may be predetermined by the manufacturer and/or provider. Alternatively or in addition, the end-user may specify the preset time interval. The time interval controls how long the sensor response control component 120 may wait prior to initiating the set of actions.

The set of actions may be predetermined by the manufacturer and/or provider, such as to shut down the communication apparatus 100. Alternatively or in addition, the end-user may specify the set of actions to be performed in absence of any user-action, or selection, within the time interval since the user notification 132. For example, the end-user may select, as the set of actions, to maintain power to all of the components of the communication apparatus 100, or, in other words, to prevent shutting down of the communication apparatus 100. In yet another example, the end-user may select shutting down the communication apparatus 100 completely as the action to take in response to the moisture event. Alternatively or in addition, the end-user may select partially shutting down the communication apparatus 100.

For example, the user notification 132 may provide the end-user an option to shut down the communication apparatus 100 completely, and an option to shut down the communication apparatus 100 partially. The end-user may select the former option resulting in the communication apparatus 100 being completely shut down. If the end-user selects the partial shutdown option instead, then some of the components or the subsystems 166 of the communication apparatus 100 may be shut down, while the rest of the components or the subsystem 166 continue to operate. The components to be shut down (or continued to operate) may be identified by the end-user before the moisture event is detected. Alternatively or in addition, the end-user may select the components to shut down (or continued to operate) in the splash screen displayed after the moisture event is detected.

For a partial shutdown, the end-user may select one or more subsystems or a predetermined set of functions of the communication apparatus 100. The predetermined set of functions of the communication apparatus 100 may be a critical set of functions, for example. The predetermined set of functions may be a list of operations and/or services that the end-user would prefer to be continued while rest of the operations and/or services of the communication apparatus 100 are shut down and/or disabled. Thus, the predetermined set of functions continues to operate in spite of the moisture event.

For example, the end-user may select voice communication related operations, such as sending/receiving telephone calls and/or sending/receiving text messages as the predetermined functions. Alternatively or in addition, the end-user may select a subset of applications that are installed on the communication apparatus 100 as the predetermined set of functions. For example, the communication apparatus 100 may have an application for placing and receiving telephone calls, an application for sending and receiving text messages, an application for sending and receiving email, an application to play music, and an application to play a game among several other applications installed. The end-user may select the applications for the telephone calls and the text messages as the predetermined set. The sensor response control apparatus 120 may identify the components or subsystems of the communication apparatus 100 that may be shut down without affecting operations of the predetermined set adversely. The identified subsystems may be disabled while the rest of the subsystems continue to operate. Alternatively or in addition, the end-user may identify one or more subsystems or components of the communication apparatus to be disabled and/or the one or more subsystems to maintain in operative state. The user selections may be performed via the user interface 130, such as the customization screens 310 and/or 320, or any other user interface.

Figure 4:
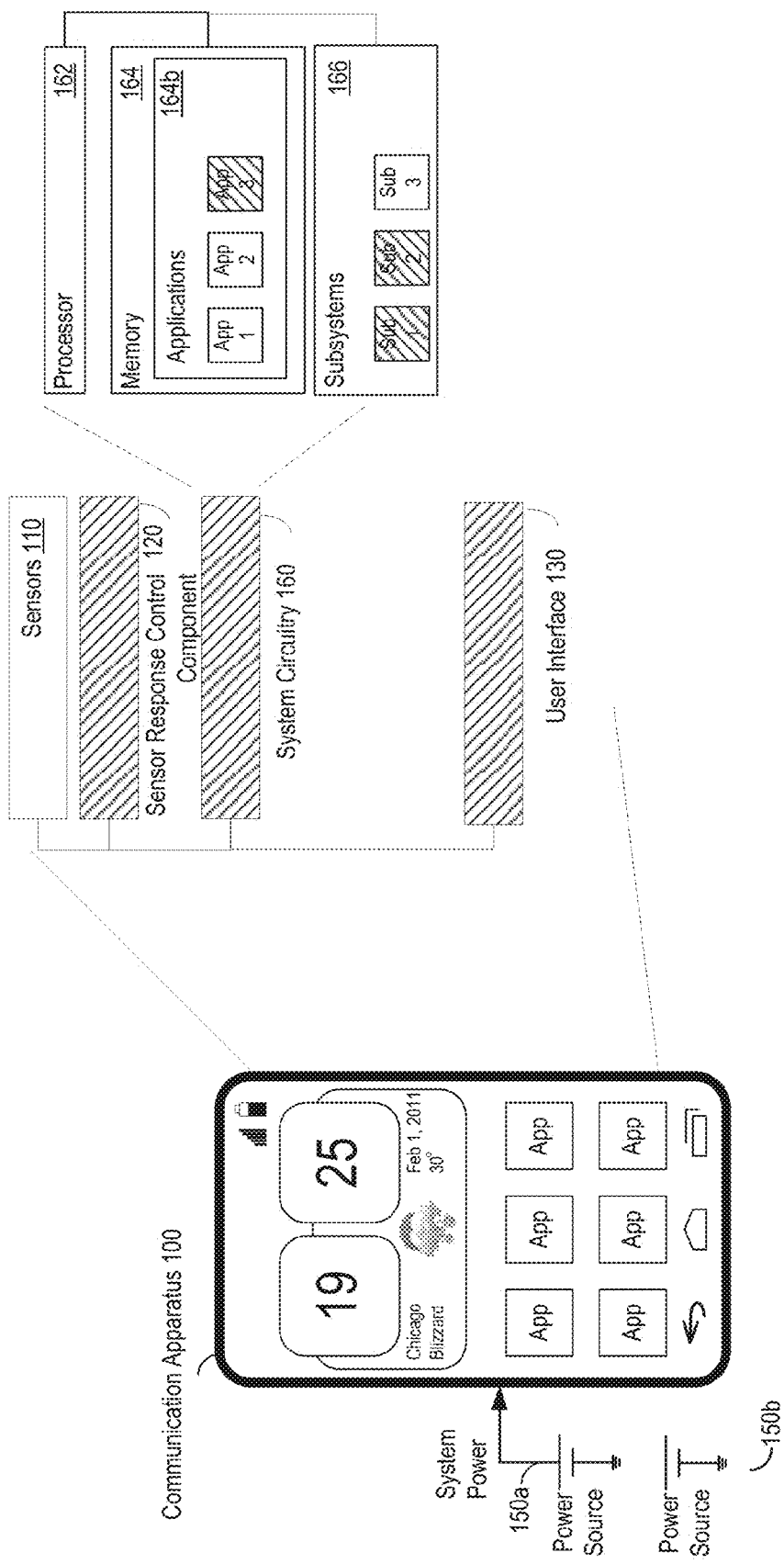
FIG. 4 illustrates another example communication apparatus.

FIG. 4 illustrates another example of a communication apparatus 100. As shown in FIG. 4, the communication apparatus 100 may include two power sources 150a and 150b. Alternatively or in addition, the communication apparatus 100 may include additional or fewer power sources. The communication apparatus 100 illustrated in FIG. 4 may include components and functionality described in connection with the communication apparatus 100 illustrated in FIG. 1. The power sources 150a and/or 150b may include electric cables and/or ports plugged into a power outlet or any other external power source, such as a battery pack, a computer, or a Universal Serial Bus (USB) hub. Alternatively or in addition, the power sources 150*a* and/or 150*b* may include one or more power sources internal to the communication apparatus 100, such as a battery or a solar cell. The power sources 150*a* and 150*b* may or may not be the same type of power source.

The two power sources 150*a* and 150*b* may provide power to all components of the communication apparatus 100. For example, the power source 150*b* may be a backup power source that is used after the power source 150*a* is drained to a predetermined level. Alternatively or in addition, the two power sources 150*a* and 150*b* may provide power to different sets of components of the communication apparatus 100. For example, the power source 150*a* may provide, or supply, power to the system circuitry 160, the sensor response control component 120, and the user interface 130, while the power source 150*b* may provide power to the sensors 110 and other components of the communication apparatus 100 (shown in FIG. 4 by shading).

The power source 150*a* may power a central processor of the communication apparatus 100 and may power a component that performs voice communication related operations of the communication apparatus 100, such as making/receiving telephone calls and/or sending/receiving text messages. In an example, the power supplied to the subsystems 166 may be further divided among the available power sources. For example, the power source 150*a* may supply power to a subsystem-1 and a subsystem-2, while the power source 150*b* may supply power to a subsystem-3. The division of power may affect the applications 164*b* of the communication apparatus 100. For example, applications that use subsystem-1 and subsystem-2, such as application-3, may depend on power source 150*a*, while application-1 and application-2 that use the subsystem-3 may depend on the power source 150*b*. Other divisions of the power sources are possible and the above description provides just some of such examples.

Figure 5:
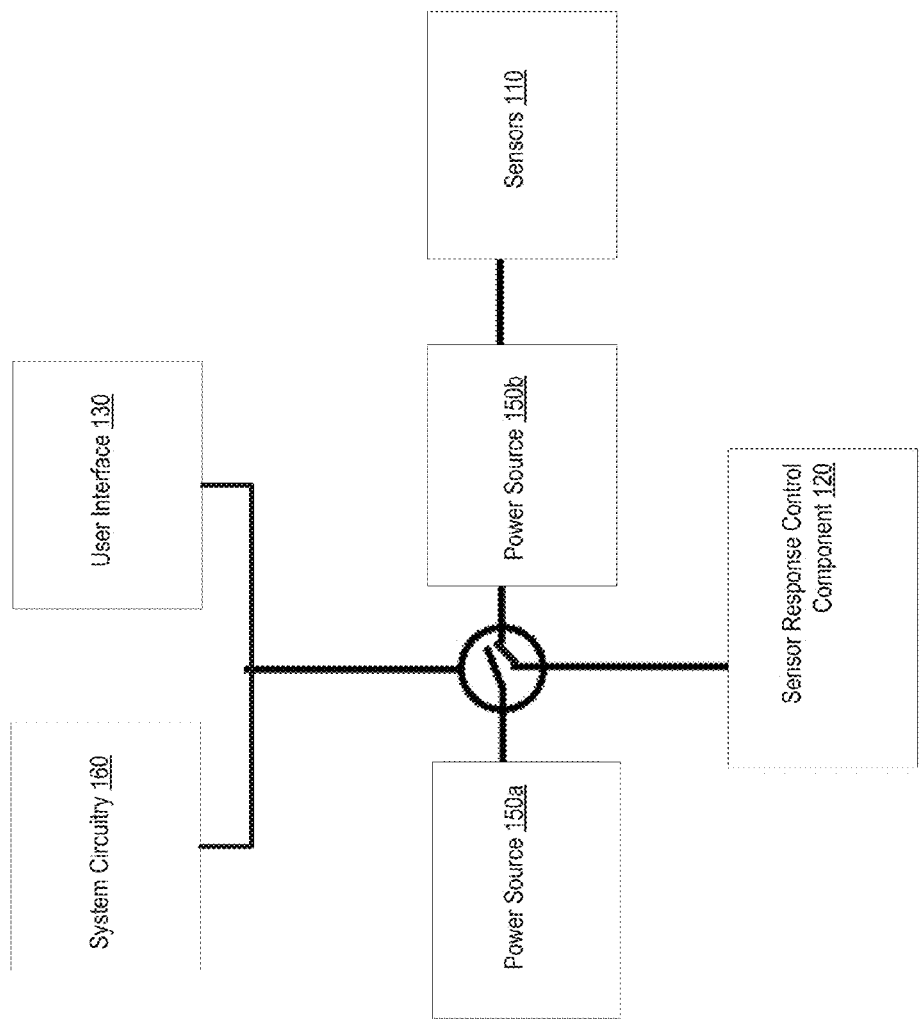
FIG. 5 illustrates an example power source configuration in response to the moisture event.

In the communication apparatus 100, in response to the selection of the partial shutdown option, the sensor response control component 120 may disconnect one or more power sources of the communication apparatus 100. FIG. 5 illustrates an example power source configuration that may be adopted in response to the moisture event. As illustrated in FIG. 5, the power source 150*a* may be disconnected while the power source 150*b* continues to provide power to the sensor response control component 120 and the sensors 110. In an example, the power source 150*b* may continue to provide power to the sensors 110, but not to the subsystems of the system circuitry 160. Reconfiguring the power source configuration in response to the moisture event may avoid damage to the system circuitry 160 of the communication apparatus 100 which may contain important data in the memory 164. Furthermore, the system circuitry 160 may be more expensive to repair and/or irreparable if the moisture causes any damage to the system circuitry 160.

The power source configuration may be customized by the end-user via the user interface 130, such as the customization screens 310 and 320. For example, the end-user may associate the power source 150*b* to supply power with one or more of the subsystems 166. Further, the end-user may configure, via the sensor response control component 120, a response to the moisture event. As part of the response, the sensor response control component 120 may disconnect the power source 150*b* from one or more components of communication apparatus 100. The power source 150*b* may be disconnected based on the user response to the user notification 132. For example, disconnection of the power source 150*b* may be part of the partial shutdown option selected by the end-user. Alternatively or in addition, the power source 150*b* may be disconnected based on the customization of the response to the moisture event. When the power source 150*b* is disconnected, the components and/or subsystems of the communication apparatus 100 that receive power from the power source 150*b* may not operate.

In another example, the power source reconfiguration may switch the source of power provided to the sensors 110 from the power source 150*b* to the power source 150*a*. The switch may be performed in response to the moisture event. Alternatively, the switch may be performed in response to the user response to the user notification 132. For example, if the end-user selects the partial shutdown option, the power source 150*b* may be completely disconnected and the sensors 110 may be reconfigured to use power from the power source 150*a*. The reconfiguration may enable the sensors 110 to continue to monitor the moisture 101 and other factors.

In the partial shutdown state, the sensors 110 may be able to determine if the communication apparatus 100 is safe to operate again. In response to a determination that the operation of the communication apparatus 100, the sensor response control component 120 may either restart the communication apparatus 100 and/or provide a user notification. For example, the sensors 110 may detect that the moisture level decreases to a level below a safety threshold value. The safety threshold value may be set by the manufacturer, provider, or the end-user. The safety threshold value may be different than a threshold moisture level 347 that triggered the earlier moisture detection resulting in the partial shutdown. In response to the moisture level falling below the safety threshold value, the sensor response control component 120 may receive a second moisture event, second moisture detection, or second moisture notification, indicative of the acceptable moisture. For example, the acceptable moisture may be due to a decrease, or reduction of moisture, such as due to evaporation, or actions taken by the end-user, manufacturer, or provider.

The sensor response control component 120, upon receipt of the second moisture event, may enable the partially shut down communication apparatus 100. For example, the subsystem(s) or component(s) of the communication apparatus 100 that was (were) shut down in response to the earlier moisture event may be restarted or powered on. In another example, if the power source reconfiguration was performed in response to the earlier moisture event, the power distribution may be restored to the state prior to the earlier moisture event. Any actions performed in response to the earlier moisture event may be reverted so that the communication apparatus 100 may be restored to an operative state in which the communication apparatus 100 was before the earlier moisture event was generated.

Alternatively or in addition, the sensor response control component 120 may generate a second user notification indicative of the acceptable moisture. The actions performed in response to the earlier moisture event may be reverted based on a user response to the second user notification. The actions may be reverted so that the communication apparatus 100 may be returned to a previous state, or condition prior to the actions being performed. For example, the second user notification may provide the end-user options to perform the reversions or to reboot the communication apparatus 100, or to perform a more extensive test to ensure, or validate, that the communication apparatus 100 is safe to operate. In some examples, the sensor response control component 120 may perform further actions based on an option selected by the end-user.

The customization screens 310 and/or 320 may further enable customization of the moisture event. For example, the customization screens 310 and/or 320 may enable configuration of when the moisture event is generated. For example, a threshold moisture condition 346 may be provided by the end-user via the customization screen 310 or 320. The threshold moisture condition may involve one or more parameters associated with moisture. A threshold moisture condition may, for example, identify the threshold moisture level 347 at which the moisture event is triggered. The moisture level 347 may be specified as a percentage moisture (or humidity) level, or an absolute moisture value. For example, a moisture level above (or below) the threshold moisture level 347 may generate or trigger the moisture event. The moisture level may be considered irrespective of a rate of change in moisture.

Alternatively or in addition, the rate of change of moisture may be used as a threshold moisture condition. For example, the rate of change may be compared to a corresponding threshold rate, and the moisture event may be generated if the rate of change of moisture exceeds (or is below) the corresponding threshold rate. The threshold values may be specified by the end-user via the user input controls 362 and 364. For example, whether the rate of change in moisture is to be considered may be specified via the user input control 362 and a rate of rise that triggers the moisture event may be specified via the user input control 364. In another example, the threshold moisture condition may be a combination of the rate of change of moisture and the moisture level. For example, the moisture event may be triggered if the rate of change of moisture and the moisture level exceed respective threshold values. Other factors associated with the moisture 101 may be used to configure one or more threshold moisture conditions in other examples.

The threshold moisture conditions may be associated with respective severity levels by the end-user via the customization screens 310 and 320. For example, a first threshold moisture condition involving a change in moisture level above a first threshold may be associated with a first severity level, while a second threshold moisture condition involving a change in moisture level above a first threshold at a first rate of change may be afforded a second severity level. The customization screen may further enable the end-user to configure a response to respective moisture events generated when each of the first and second threshold moisture conditions are met. For example, the end-user may deem the first severity level as a lower risk level than the second severity level (or vice versa).

Accordingly, the end-user, via a customization screen, may configure the user notification 132 to be provided in response to the moisture event of the first severity level. Further, the end-user may specify that the sensor response control component 120 may shut down the communication apparatus 100, without the user notification 132, in response to the moisture event of the second (higher) severity level. Although threshold moisture conditions of a first and second severity levels are described in the exemplary case above, in other examples, fewer or additional threshold moisture conditions, and/or fewer or additional severity levels may be specified by the end-user using a customization screen. Further, it is understood that the relative severity of the threshold moisture conditions discussed here is exemplary, and that other severity levels may be assigned by the end-user in other examples.

The customization screens 310 and/or 320 may also enable configuring sensitivity of the sensors 110 to detect the moisture in proximity of the communication apparatus 100. Further, an interrogation rate, representative of a frequency at which the moisture detection is performed may be specified via the user controls 366 and 370. The interrogation may be provided as a quantity (numerical value, percentage), or in relative terms, such as a level, or degree (low, medium, high). For example, the interrogation rate may be set as, for example, 5 ms, 10 ms, or 15 ms. Alternatively or in addition, the interrogation rate may be set as low, medium, or high. In other examples, the interrogation rate may be set using a slider control.

The threshold values and/or settings may form the set of parameter values provided to the sensors 110. The sensors 110 may generate the moisture event, detection, or notification, based on the set of parameter values. The parameter values may be provided as quantities (numerical value, percentage), or in relative terms, such as a level, or degree (low, medium, high). The selected degree may be translated into a corresponding quantity.

The parameter values may be communicated to the sensors 110 by the sensor response control component 120. Alternatively or in addition, the parameter values may be stored as the sensor parameters 234 in the memory 230 of the sensor response control component 120. The parameter values may be stored in other memory locations in other examples. The response selections specified by the end-user via the user interface may be stored as the response configurations 236 in the memory 230 of the sensor response control component 120. The response selections may be stored in other memory locations in other examples.

The sensors 110 may be divided into logical groups, such as tier 1 and tier 2, or primary tier and secondary tier, or any other logical grouping. For example, the accelerometer may be a tier 1 sensor while the moisture sensor may be a tier 2 sensor. More logical groups of the sensors may be possible, and different combinations of association of sensors with the logical groups may be possible than the exemplary cases described. The logical groups may be customizable by the end-user, provider, or manufacturer, via the user interface.

The user interface 130 may enable customizing sensor events of one sensor in combination with another sensor, such as the moisture sensor and the accelerometer. The combination may involve a sensor from one logical group and a second sensor from a second logical group. Alternatively or in addition, the combination may involve sensors from the same group. In another example, sensors of the same type may be classified into logical groups. For example, moisture sensors may be divided into primary moisture sensors and secondary moisture sensors. The classification may be based on location of the moisture sensors in the communication apparatus. For example, the moisture sensors closer to the periphery of the communication apparatus may be considered as the secondary moisture sensors while those more internal may be considered the primary moisture sensors. Based on the combination, the user interface may enable customizing behavior of one sensor in response to an event detected by a second sensor.

Figure 6:
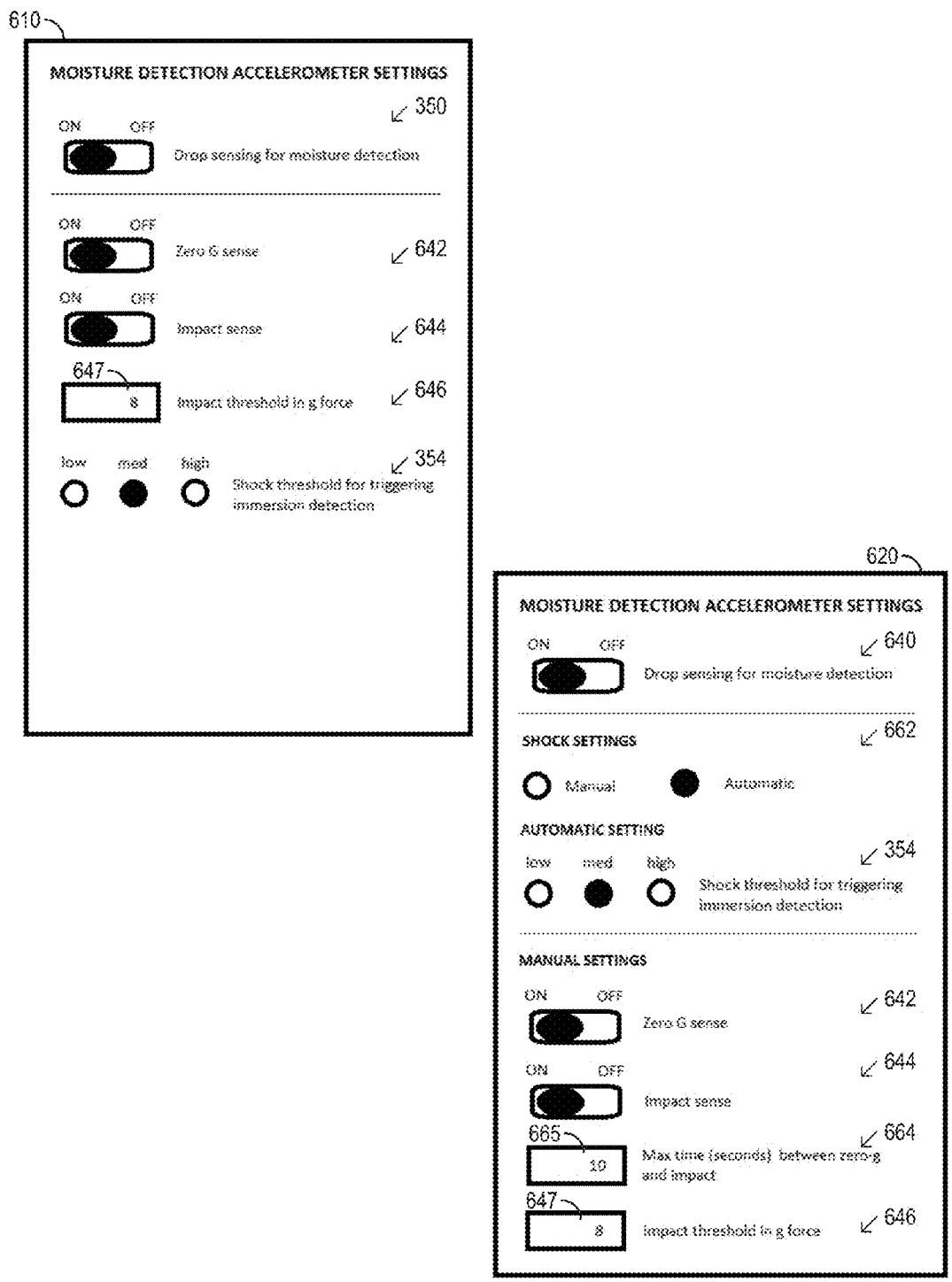
FIG. 6 illustrates example customization screens for a combination of sensors.

FIG. 6 illustrates example customization screens 610 and 620 for a combination of sensors. For example, the end-user may customize operation of the moisture sensor during regular operation and, in addition, customize the moisture sensor to operate differently in response to a drop event being detected. A drop event may indicate that the communication apparatus 100 is falling. A drop event may be generated by the accelerometer or other type drop sensor.

For example, the set of parameter values described earlier may be a first set of parameter values to operate the moisture sensor. In addition, the end-user, via the customization screens, may provide a second set of parameter values to use in case the drop event has been triggered. The second set of parameter values may include a different interrogation rate, different threshold values, and/or different sensitivity values than are in the first set of parameter values. The moisture sensor may consume more power when operating using the second set of parameter values compared to operating using the first set of parameter values (or vice versa). Therefore, by operating according to the first set of parameter values (or in absence of the drop event) may help conserve power.

The end-user may, alternatively, or in addition, specify threshold conditions related to the drop sensor that triggers the moisture sensor to operate using the second set of parameter values. The end-user may turn on/off detections that may be performed by the drop sensor, such as g sense and/or impact sense via the user input controls 350, 642, and/or 644. The g-sense may detect gravitational forces that act on the communication apparatus during changes in velocity, such as during a roller coaster ride, or while the communication apparatus may be falling. The impact sense may measure the forces that act on the communication apparatus after an impact is detected, such as after a fall. The end-user may further specify the threshold conditions for the various parameters detected by the drop sensor. For example, a threshold g force value 647 may be specified via the user control 646. Crossing the threshold g force value 647 in either direction may trigger the moisture sensor to switch operation from the first set of parameter values to the second. The threshold conditions may be specified as a matter of degree via the user input control 354, or as quantities via the user input controls 646. For example, a shock value to trigger the moisture sensor change may be specified as low, medium, or high, via the user input control 354. The end-user may specify an interrogation rate 665 of the drop sensor via the user input control 664.

In another example, the end-user may choose to set the threshold conditions automatically via the user input control 662. Automatic configuration may specify threshold conditions for the sensor as per specifications of the manufacturer of the communication apparatus 100. Manual configuration of the drop sensor may enable specifying the threshold conditions per the end-user's desire as described earlier.

Multiple customization screens 310-320 and 610-620 are illustrated and described. However, in other examples, the end-user may specify configuration settings for the moisture sensor, the moisture event, and the response to the moisture event via a single screen. In other examples, the configuration settings may be provided via the user interface 130 based on audio input/output without involving the display device. In yet other examples, the end-user may specify the configuration settings via a combination of audio and visual input/output. The customization screens and user input controls illustrated and described are examples and various other arrangements and combinations are possible in other examples.

A combination of the moisture sensor and the accelerometer is described. However, other combinations of the sensors 110 may be used in other examples, such as a heat sensor and a moisture sensor, or an accelerometer and a heat sensor. In other examples, combinations of two or more sensors may be configured via one or more customization screens. For example, the moisture sensor may switch operation in response to events from an accelerometer and a gyroscope.

The sensor response control component 120 may enable configuring the sensors 110 and the threshold conditions to generate events based on whether the customization is being performed by the manufacturer, provider, or end-user. For example, the manufacturer may have complete flexibility, or freedom to configure the sensors 110 and the events. However, customizations by the provider (such as a mobile carrier service) and/or the end-user may be limited, or constrained. For example, the manufacturer may constrain certain aspects of the sensors 110 from being customized. For example, the manufacturer may not permit the moisture level threshold value to be customized by the end-user. Alternatively or in addition, the manufacturer may constrain customization of parameter values within a permitted range. For example, the end-user may adjust the moisture level threshold value only within a moisture level range set by the manufacturer. In some examples, the constraints may be categorized, limited, and/or relaxed, for an administrator, primary user account, and or a guest account. For example, an administrator may further constrain the customizations permitted by the manufacturer. Further, the primary user may constrain the customizations by a guest user. The primary user and the guest user may be identified based on the login information, such as username, password, fingerprint of any other identification information provided at login, or booting the communication apparatus.

Figure 7:
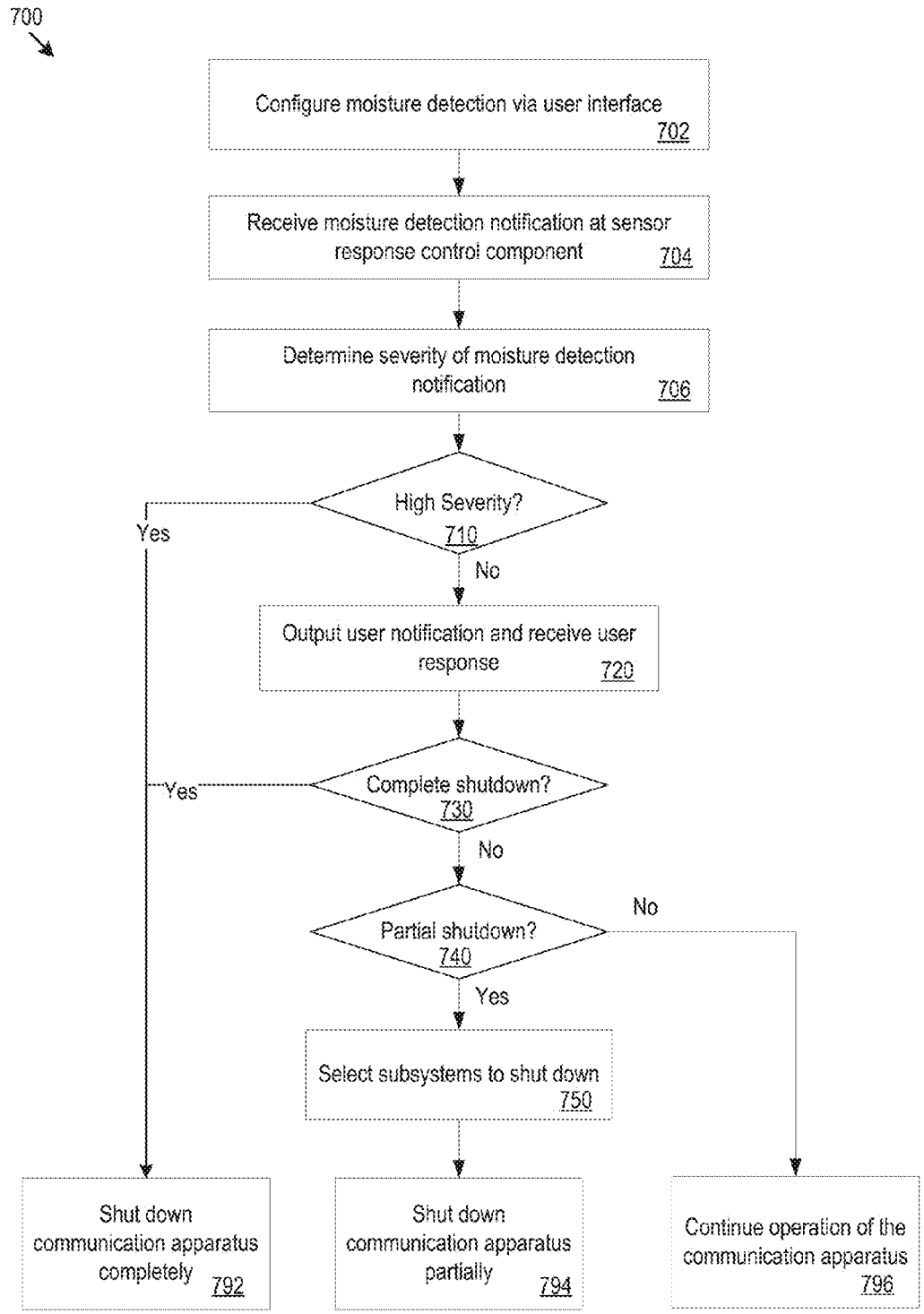
FIG. 7 illustrates an example flowchart of steps performed by components of a communication apparatus.

FIG. 7 illustrates a flowchart of example operations performed by components of the communication apparatus 100. The operations may be performed in an order different than illustrated in FIG. 7. The additional, fewer, or different operations may be performed by the components of the communication apparatus 100.

The end-user may specify parameters to configure sensors 110 of the communication apparatus (702). The configuration may involve specifying one or more threshold conditions, sensitivity, interrogation rate, and/or other parameter values according to which the sensors 110 may detect the moisture 101. For example, a severity level associated with the respective threshold conditions may be specified. Alternatively or in addition, a response to the moisture detection notification based on the respective severity levels may be configured. Upon meeting or crossing the one or more threshold conditions, the sensors 110 may generate a moisture event or a moisture detection notification.

The sensor response control component may receive the moisture detection notification (704). The severity of the moisture detection notification may be identified according to the user specifications or user settings (706). For example, the end-user may have specified that the sensor response control component 120 completely shut down (792) the communication apparatus in response to a moisture detection notification of high severity (710). Whereas, in response to a moisture detection notification of a low and/or medium severity (710), the sensor response control component may be configured to output (720) a user notification. A user response may be received in response to the user notification. The user notification may provide information about the moisture detection notification received, such as the severity level of the moisture detection notification. Based on the user response, further actions may be taken. For example, the end-user may select complete shutdown (730) of the communication apparatus, and the communication apparatus may be shut down (792). Alternatively, the end-user may select (740) a partial shutdown of the communication apparatus. The end-user may be enabled, via the user interface, to select (750) the components of the communication apparatus to be shut down or maintained as part of the partial shutdown. Alternatively or in addition, the selection of components may be performed as part of the configuration (702) of the response. The components selected to be shut down are then powered down (794) as part of the partial shutdown. Alternatively or in addition, the partial shutdown may entail disconnecting and/or reconfiguring one or more power sources of the communication apparatus. Alternatively or in addition, the user response may opt to continue (796) the operations of the communication apparatus as is, despite the moisture detection notification. For example, the communication apparatus may remain operational during an emergency situation, such as fire, medical emergency, or any other emergency situation, in which the end-user desires to prevent shutting down the communication apparatus completely or partially.

Figure 8:
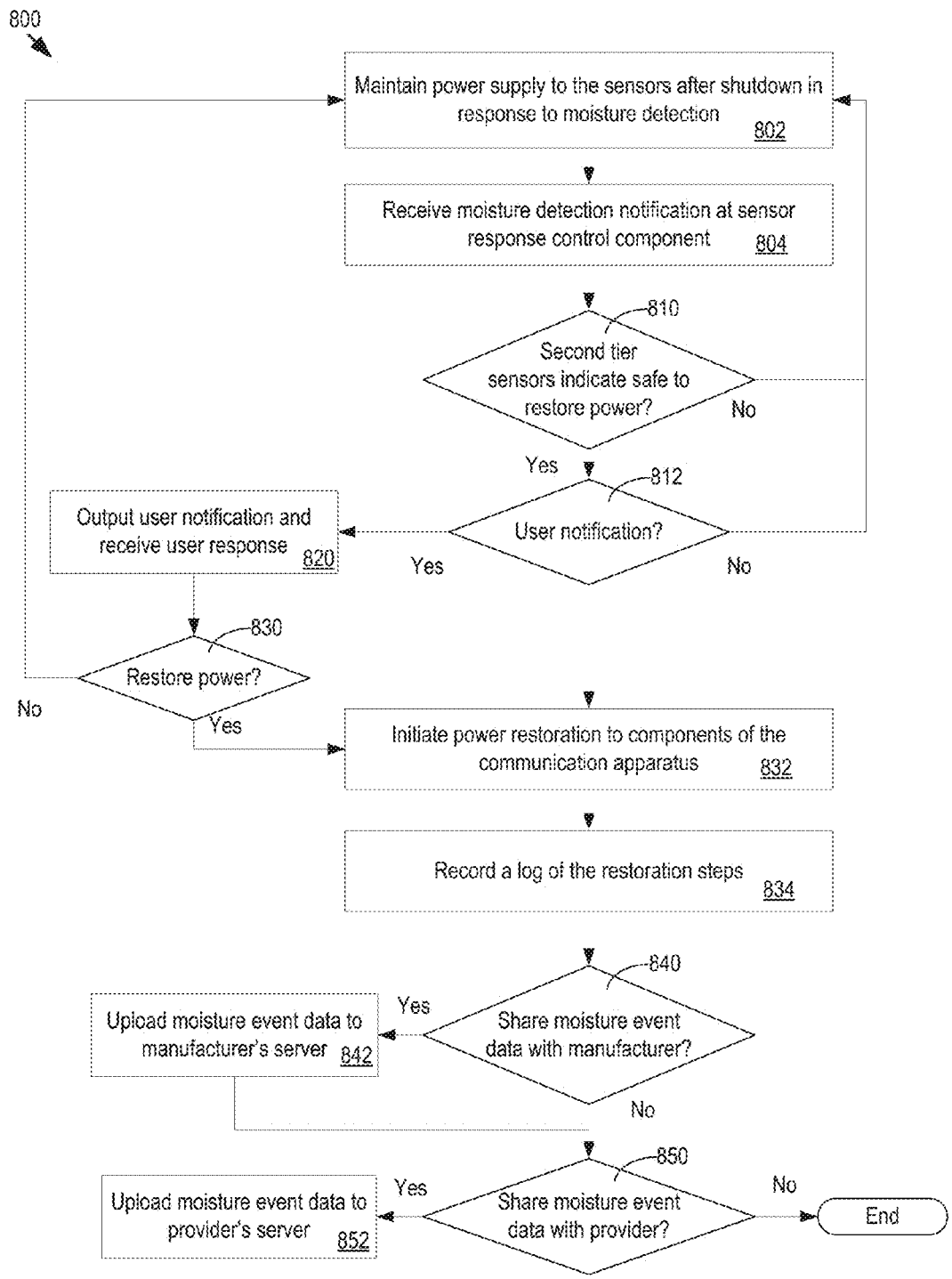
FIG. 8 illustrates an example flowchart of steps performed by components of a communication apparatus.

FIG. 8 illustrates an example flowchart of operations performed by components of a communication apparatus 100. The steps illustrated in FIG. 8 may be performed after the communication apparatus has been shut down partially in response to moisture detection. The power supply to the sensors 110 may be maintained (802) after the partial shutdown. In an example, the power supply may be maintained to a secondary tier of sensors, such as those on the periphery of the communication apparatus. In another example, all the sensors 110 are provided power. The sensors 110 supplied with power may continue to detect the moisture 101 of the communication apparatus and identify when the power to the disabled components of the communication apparatus may be restored. For example, the moisture sensor may detect when the moisture level has decreased below a user specified threshold condition. The sensors 110 may generate a second moisture event, moisture detection notification when the moisture has been removed from the device. The second moisture detection notification may be received (804) by the sensor response control component 120. For example, the secondary tier of sensors may identify the reduction in moisture. Based on the user settings, the sensor response control component 120 may determine if a user notification is to be output (812) requesting user response. Accordingly, either a user notification may be output (820), or the communication apparatus may be maintained (802) in the partial shutdown state. Alternatively or in addition, if the end-user has specified any other actions to be performed in response to the second moisture detection notification, the sensor response control component 120 may perform such actions.

The user response may select (830) restoration of the power or continuing to keep the communication apparatus in the partial shutdown state. In case the end-user opts to restore the power, the sensor response control component 120 may initiate restoration of power (832) to the components of the communication apparatus. The power may be restored in a cascading style. For example, a component may be enabled and the moisture sensors interrogated to validate that the communication apparatus is still safe to operate and that the power restoration should continue. Alternatively or in addition, prior to other components, all sensors 110 of the communication apparatus, from all tiers, or logical groups, may be enabled in response to the second moisture detection notification from the sensors in the second tier. A log of all the steps performed may be maintained (834) in the memory 164. For example, the sequence in which the components are powered on and the moisture levels and other detectable parameters after ever component is restored may be recorded in the log.

The end-user may specify whether to share with the manufacturer, provider, or any other entity, the log as well as the data associated with an earlier moisture detection notification that resulted in the partial shutdown of the communication apparatus. If the user settings indicate sharing the data (840) with the manufacturer of the communication apparatus, the data may be uploaded to the manufacturer's server (842). The information associated with the manufacturer's server, such as an IP address, URL, FTP location, or any other information pertinent to uploading the data may be known to the sensor response control apparatus 120. For example, such information may be stored in the memory 164, or at another location accessible by the sensor response control apparatus 120. Alternatively or in addition, if the user settings indicate sharing the data with the provider (850) of the communication apparatus, the data may be uploaded to the provider's server (852). The manufacturer and/or the provider may thus be notified of the moisture detection and consequent successful restoration of the communication apparatus.

The operations may be performed in an order different than illustrated in FIG. 8. Additional, fewer, or different operations may be performed by the components of the communication apparatus 100 than illustrated in FIG. 8.

Figure 10:
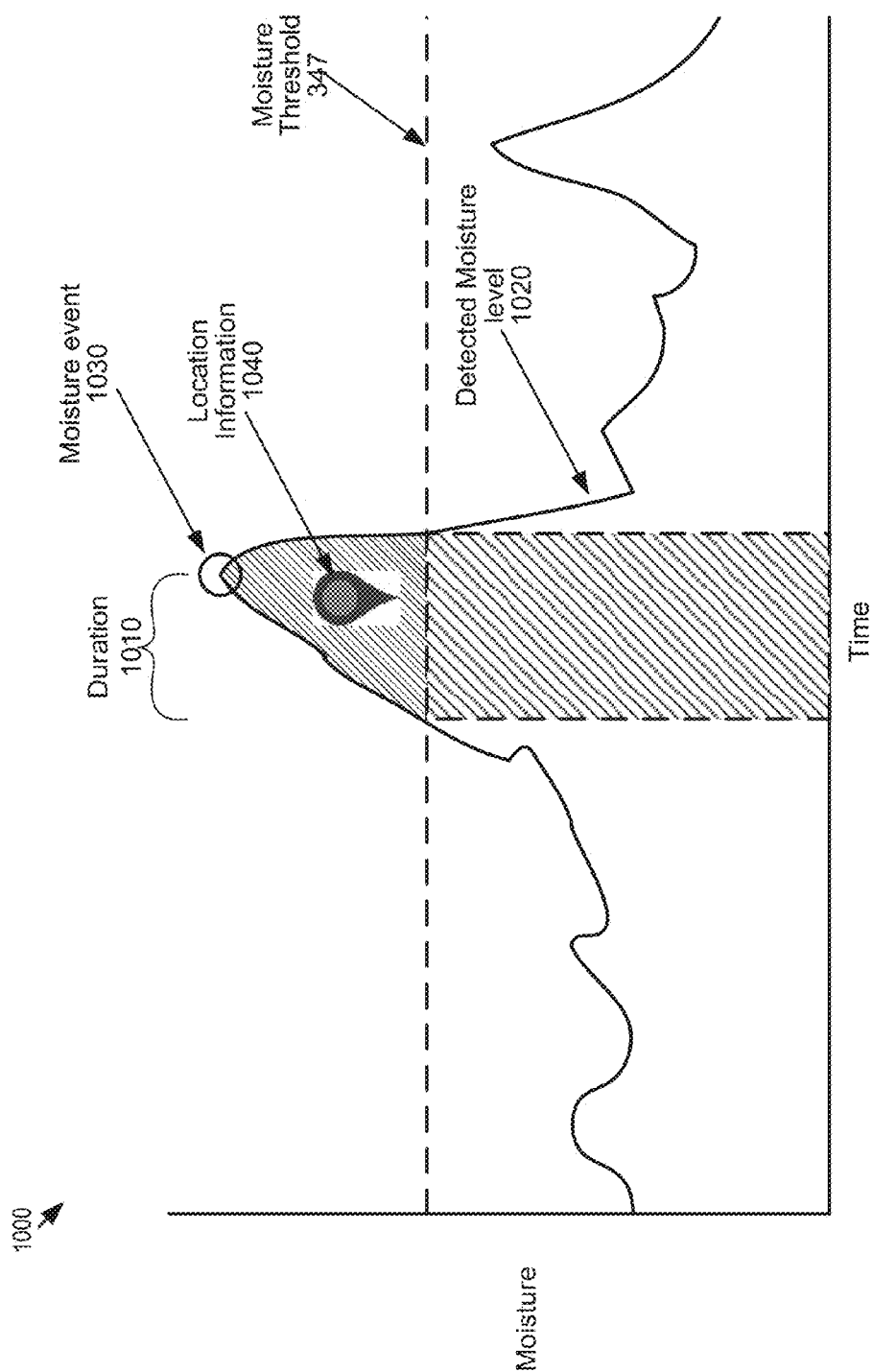
FIG. 10 illustrates an example chart of moisture data.

FIG. 10 illustrates an example chart 1000 of the moisture data. In an example, the processor 162 may analyze the moisture data. Alternatively or in addition, an external system, such as a server that has access to the moisture data, may analyze the moisture data. For example, the server may be included in the manufacturer's or the provider's servers. Alternatively or in addition, the server may be a third party's server that the end-user has authorized to access and analyze the moisture data. The moisture data may include data associated with one or more moisture events. The moisture data may include moisture level detected by the moisture sensor over a period. The moisture data may include state information of the communication apparatus 100 at the time of detection and/or generation of one or more moisture events. For example, the moisture data may include a moisture level, a location, a time, an acceleration, and other information from the components of the communication apparatus 100 at the time of the one or more moisture events. The end-user may specify the number of moisture events for which to store moisture data.

The analysis, for example, may output the chart 1000 of humidity/moisture vs. time. The end-user may view the chart 1000 via the user interface 130, in some examples. The chart 1000 may illustrate, for reference, the moisture threshold 347 specified by the end-user, the detected moisture level 1020 by the moisture sensor, and the moisture event 1030. The moisture event 1030 illustrates the condition at which the moisture event 1030 was generated, such as the moisture level and the time at which the moisture event 1030 was generated. The chart 1000 may use different visual elements to represent different aspects of the moisture data. For example, the chart 1000 may represent the detected moisture level 1020 using a first color, such as blue, as long as the detected moisture level 1020 is below the moisture threshold 347. The detected moisture level 1020 may be in a second color, such as red, at levels above the moisture threshold 347. The moisture threshold 347 may be in a third color, such as green. Alternatively and in addition, other visual elements, such as a dashed line, a fill pattern, a transparency level, and/or any other graphic representation may be used in the chart 1000. The user interface 130 may provide audio cues, such as a beep, a spoken word, or other audio outputs during user interaction with the chart 1000.

The chart 1000 may illustrate additional aspects of the moisture data. For example, the chart 1000 may display a duration 1010. The duration 1010 may be the period of time for which the moisture sensor detected a moisture level that exceeds the moisture threshold 347. Alternatively or in addition, location data 1040, such as GPS (global position satellite) data, may be overlaid on the chart 1000 to provide location information at moisture events of interest. The end-user may select a location on the chart 1000 (for example, at a moisture event where the maximum moisture threshold has been surpassed). The end-user may interact with the chart 1000 to query the moisture data for additional details. For example, the end-user may provide a user input 134 via the user interface 130. In response, the user interface 130 may provide a pop-up window that may show a time of the moisture event 1030, an acceleration leading up to the moisture event (as collected from accelerometer), and/or a location data 1040 (gathered by GPS). The amount of time the analysis looks for acceleration prior to a moisture event may be set by the end-user. The end-user may zoom in and/or out on the axes of the chart 1000, such as the time scale in order to provide a view of more or less data with respect to the time axis. User interactions with the chart 1000, other than the examples described here, are possible.

The examples provided describe configuring and responding to a moisture event, or moisture detection indication. However, the technical solutions described throughout the present document are applicable for events detected and generated by other types of sensors, such as an accelerometer, gyroscope, thermometer, or any other sensor. The examples provided are few of several possible examples that would be evident based on the description in the present document. Further, the examples provided describe the user interface using customization screens such as those illustrated in FIGS. 3 and 6. However, different and/or additional customization screens are possible and the customization screens illustrated are few of several possible examples. Further, the user interface may involve user interactions other than, or in addition to, a display. For example, audio notifications, commands, and responses may be used to provide user notifications and receive user responses. Other user interface medium may also be used in other examples.

The system 100 may be implemented in many different ways. Each component, such as the sensors 110, the sensor response control component 120, the user interface 130, and the system circuitry 160, may be hardware or a combination of hardware and software. For example, each component may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each component may include memory hardware, such as a portion of the memory 164, for example, that comprises instructions executable with the processor 162 or other processor to implement one or more of the features of the component. When any one of the component includes the portion of the memory that comprises instructions executable with the processor, the component may or may not include the processor. In some examples, each component may just be the portion of the memory 164 or other physical memory that comprises instructions executable with the processor 162 or other processor to implement the features of the corresponding component without the component including any other hardware. Because each module includes at least some hardware even when the included hardware comprises software, each component may be interchangeably referred to as a hardware component, such as the sensor hardware, the sensor response control hardware, the user interface hardware, and the system circuitry hardware.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the components of the communication apparatus 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)). As another example, the DLL may itself provide all or some of the functionality of the system, tool, or both.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various components and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways.

The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A communication apparatus comprising:
a moisture sensor configured to generate a moisture event based on detection of moisture and to generate a moisture notification based on a set of parameter values;
a drop sensor comprising an accelerometer configured to detect a drop event of the communication apparatus and to generate a drop notification in response to detecting the drop event;
a sensor response control component configured to receive the moisture event and the drop notification from the accelerometer and, in response, generate a user notification; and
a user interface configured to output the user notification and to receive a user response, wherein the sensor response control component is further configured to shut down at least one of the communication apparatus or a subsystem of the communication apparatus based on the user response.

2. The communication apparatus of claim 1, wherein, the sensor response control component is further configured to:
monitor time elapsed since the output of the user notification; and
shut down the at least one of the communication apparatus or the subsystem of the communication apparatus in response to the time elapsed exceeding a preset value.

3. The communication apparatus of claim 2, wherein, the sensor response control component is further configured to:
shut down the communication apparatus based on the user response including a first user response; and
shut down the subsystem of the communication apparatus and continue operation of rest of the communication apparatus based on the user response including a second user response.

4. The communication apparatus of claim 3, further comprising:
a first power source; and
a second power source configured to provide power to the subsystem of the communication apparatus; and
wherein, the sensor response control component is further configured to disconnect the second power source based on the user response including the second user response.

5. The communication apparatus of claim 4, wherein the sensor response control component is further configured to continue operation of the first power source based on the user response including the second user response.

6. The communication apparatus of claim 5, wherein the first power source is configured to provide power to a central processor of the communication apparatus.

7. The communication apparatus of claim 6, wherein the moisture sensor response control component is further configured to switch source of power of the moisture sensor from the second power source to the first power source in response to the user response including the second user response.

8. The communication apparatus of claim 2, wherein the moisture event is a first moisture event indicative of an increase in moisture, and wherein: the moisture sensor is configured to generate a second moisture event indicative of a decrease in the moisture; and the sensor response control component is further configured to receive the second moisture event and, in response, enable the subsystem of the communication apparatus that was shut down based on the user response to the first moisture event.

9. A method comprising:
receiving, via a user interface of a communication apparatus, a set of user-specified parameter values of a moisture sensor of the communication apparatus;
configuring, by a sensor response control component, the moisture sensor with the set of parameter values;
generating a drop notification from a second sensor;
receiving, by the sensor response control component, the drop notification from the second sensor, wherein receiving the drop notification from the second sensor comprises receiving a drop notification from an accelerometer of the communication apparatus;

generating, by the moisture sensor a moisture notification based on the set of parameter values; and configuring, by the sensor response control component, an action responsive to the moisture notification and the drop notification.

10. The method of claim 9, wherein the set of parameter values is a first set of parameter values, the method further comprising:

configuring, by the sensor response control component, the moisture sensor either with the first set of parameter values or a second set of parameter values depending on the drop notification from the second sensor; and generating, by the moisture sensor, the moisture notification based on the second set of parameter values.

11. The method of claim 9, wherein the set of parameter values comprises at least one of a moisture level, an interrogation rate, or a sensitivity.

12. The method of claim 9, further comprising:

configuring, by the sensor response control component, an action responsive to the moisture notification generated by the moisture sensor, wherein configuring the action comprises:

receiving, via the user interface, a threshold moisture condition, wherein:

in response to receipt of the moisture notification and the threshold moisture condition being met, the communication apparatus is shut down, and in response to receipt of the moisture notification and the threshold moisture condition not being met, a user response is requested.

13. The method of claim 12, wherein configuring the action further comprises:

selecting, via the user interface, a subsystem of the communication apparatus, wherein operation of the subsystem is continued in response to the moisture notification.

14. The method of claim 13, wherein the subsystem selected is a communication subsystem of the communication apparatus.

15. The method of claim 12, wherein configuring the action further comprises:

enabling, via the user interface, data associated with the moisture notification to be shared with a manufacturer of the communication apparatus.

16. A non-transitory computer storage medium comprising instructions executable by a processor, the non-transitory computer storage medium comprising:

instructions executable to configure, via a user interface, a setting associated with moisture detection in a communication apparatus, the setting based on a set of parameter values, and a second setting associated with a drop event generated by a drop sensor comprising an accelerometer;

instructions executable to output, via the user interface, a user notification in response to the moisture detection and the drop event;

instructions executable to receive, via the user interface, a user selection in response to the user notification; and instructions executable to disconnect a first power source of the communication apparatus and continue operation of a second power source of the communication apparatus based on the user selection.

17. The non-transitory computer storage medium of claim 16 further comprising instructions executable to disconnect the first power source of the communication apparatus and disconnect the second power source of the communication apparatus based on the user selection.

18. The non-transitory computer storage medium of claim 16, wherein the settings comprise a severity level of the moisture detection, and the non-transitory computer storage medium further comprising instructions executable to configure, via the user interface, an action responsive to the moisture detection based on the severity level of the moisture detection, wherein the configuration of the action comprises selection of a set of operations of the communication apparatus to be disabled in response to the moisture detection having a first severity level.

19. The non-transitory computer storage medium of claim 18, wherein the configuration of the action further comprises identification of a second severity level in response to which the communication apparatus is shut down without the user notification.

* * * * *